United States Patent
Lee et al.

(10) Patent No.: US 12,299,316 B2
(45) Date of Patent: May 13, 2025

(54) METHOD OF WRITING DATA IN STORAGE DEVICE USING WRITE THROTTLING AND STORAGE DEVICE PERFORMING THE SAME

(71) Applicant: SAMSUNG ELECTRONICS CO., LTD., Suwon-si (KR)

(72) Inventors: Jinwook Lee, Suwon-si (KR); Dongouk Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 68 days.

(21) Appl. No.: 18/132,092

(22) Filed: Apr. 7, 2023

(65) Prior Publication Data

US 2023/0401002 A1    Dec. 14, 2023

(30) Foreign Application Priority Data

Jun. 8, 2022    (KR) .................. 10-2022-0069419

(51) Int. Cl.
  *G06F 3/00*    (2006.01)
  *G06F 3/06*    (2006.01)
(52) U.S. Cl.
  CPC .......... *G06F 3/0655* (2013.01); *G06F 3/0604* (2013.01); *G06F 3/0653* (2013.01); *G06F 3/0679* (2013.01)
(58) Field of Classification Search
  None
  See application file for complete search history.

(56) References Cited

U.S. PATENT DOCUMENTS

| | | | |
|---|---|---|---|
| 7,849,261 B2 | 12/2010 | Pherson et al. |
| 8,060,797 B2 | 11/2011 | Hida et al. |
| 8,219,861 B2 | 7/2012 | Hida et al. |
| 8,583,972 B2 | 11/2013 | Hida et al. |

(Continued)

FOREIGN PATENT DOCUMENTS

| | | |
|---|---|---|
| EP | 2 602 707 A2 | 6/2013 |
| JP | 20030330815 A | 11/2003 |

(Continued)

OTHER PUBLICATIONS

Communication issued Oct. 25, 2023 by the European Patent Office in European Patent Application No. 23173484.9.

*Primary Examiner* — Midys Rojas
(74) *Attorney, Agent, or Firm* — Sughrue Mion, PLLC

(57) ABSTRACT

A method of writing data in a storage device is provided. The method includes: receiving write data from a host device; monitoring an operating temperature of the storage device; generating a plurality of write data blocks respectively corresponding to a plurality of storage regions of the storage device based on the write data; and based on the operating temperature, performing a write throttling operation including performing a write operation on P write data blocks among the plurality of write data blocks by transmitting a write command to P storage regions among the plurality of storage regions and skipping the write operation on X write data blocks among the plurality of write data blocks by skipping an operation of transmitting the write command to X storage regions among the plurality of storage regions. P and X are natural numbers.

20 Claims, 29 Drawing Sheets

(56) References Cited

U.S. PATENT DOCUMENTS

| | | | |
|---|---|---|---|
| 8,793,555 B2 | 7/2014 | Hida et al. | |
| 8,819,522 B2 | 8/2014 | Baba | |
| 9,037,947 B2 | 5/2015 | Hida et al. | |
| 9,152,568 B1 | 10/2015 | Seigler et al. | |
| 10,156,987 B1 | 12/2018 | Gutierrez et al. | |
| 10,175,887 B2 | 1/2019 | Kanno | |
| 10,564,861 B2 | 2/2020 | Linnen et al. | |
| 10,592,117 B2 | 3/2020 | Kanno | |
| 11,119,693 B2 | 9/2021 | Ahn et al. | |
| 2008/0256183 A1 | 10/2008 | Flynn et al. | |
| 2015/0046637 A1 | 2/2015 | Chien et al. | |
| 2017/0351456 A1* | 12/2017 | Beulshausen | G06F 3/0634 |
| 2019/0050161 A1 | 2/2019 | Wysocki et al. | |
| 2019/0129847 A1* | 5/2019 | Roh | G06F 3/0604 |
| 2019/0213069 A1 | 7/2019 | Gao et al. | |
| 2019/0286374 A1 | 9/2019 | Gupta | |
| 2021/0405916 A1 | 12/2021 | Ahn et al. | |

FOREIGN PATENT DOCUMENTS

| | | |
|---|---|---|
| JP | 2014-167809 A | 9/2014 |
| JP | 2015-32317 A | 2/2015 |
| JP | 2017-117054 A | 6/2017 |
| KR | 10-2009-0131285 A | 12/2009 |
| KR | 10-2021-0013845 A | 2/2021 |

* cited by examiner

| STORAGE REGION | TEMPERATURE |
|---|---|
| SR1 | TEMP_SR1 |
| SR2 | TEMP_SR2 |
| SR3 | TEMP_SR3 |
| SR4 | TEMP_SR4 |
| SR5 | TEMP_SR5 |
| SR6 | TEMP_SR6 |

| STORAGE REGION | P/E CYCLE |
|---|---|
| SR1 | PE_SR1 |
| SR2 | PE_SR2 |
| SR3 | PE_SR3 |
| SR4 | PE_SR4 |
| SR5 | PE_SR5 |
| SR6 | PE_SR6 |

| STORAGE REGION | PROGRAM TIME |
|---|---|
| SR1 | PT_SR1 |
| SR2 | PT_SR2 |
| SR3 | PT_SR3 |
| SR4 | PT_SR4 |
| SR5 | PT_SR5 |
| SR6 | PT_SR6 |

METHOD OF WRITING DATA IN STORAGE DEVICE USING WRITE THROTTLING AND STORAGE DEVICE PERFORMING THE SAME

CROSS-REFERENCE TO RELATED APPLICATION

This application claims priority to Korean Patent Application No. 10-2022-0069419 filed on Jun. 8, 2022 in the Korean Intellectual Property Office, the disclosure of which is incorporated by reference herein in its entirety.

BACKGROUND

1. Technical Field

Example embodiments relate generally to semiconductor integrated circuits, and more particularly to methods of writing data in storage devices using write throttling, and storage devices performing the methods of writing data.

2. Description of Related Art

A storage system includes a host device and a storage device, and the storage device may be a memory system including a memory controller and a memory device or a memory system including only a memory device. In the storage system, the host device and the storage device are connected to each other through various interface standards, such as universal flash storage (UFS), serial advanced technology attachment (SATA), small computer system interface (SCSI), serial attached SCSI (SAS), embedded multi-media card (eMMC), etc. Recently, a storage system includes storage devices with high performance, and interface specifications are increasing. In addition, when data is written in a storage system, an operating temperature increases and power consumption increases, which affects the entire storage system. Therefore, methods for protecting storage systems are needed.

SUMMARY

At least one example embodiment provides a method of writing data in a storage device capable of effectively performing a data write operation with little degradation of write performance, using write throttling.

At least one example embodiment provides a storage device performing the method of writing data.

According to example embodiments, a method of writing data in a storage device, includes: receiving write data from a host device; monitoring an operating temperature of the storage device; generating a plurality of write data blocks respectively corresponding to a plurality of storage regions of the storage device based on the write data; and based on the operating temperature, performing a write throttling operation including performing a write operation on P write data blocks among the plurality of write data blocks by transmitting a write command to P storage regions among the plurality of storage regions and skipping the write operation on X write data blocks among the plurality of write data blocks by skipping an operation of transmitting the write command to X storage regions among the plurality of storage regions. P and X are natural numbers.

According to example embodiments, a storage device includes: a nonvolatile memory; and a storage controller configured to: receive write data from a host device; monitor an operating temperature of the storage device; generate a plurality of write data blocks respectively corresponding to a plurality of storage regions of the nonvolatile memory based on the write data; and based on the operating temperature, perform a write operation on P write data blocks among the plurality of write data blocks by transmitting a write command to P storage regions among the plurality of storage regions and skipping the write operation on X write data blocks among the plurality of write data blocks by skipping an operation of transmitting the write command to X storage regions among the plurality of storage regions. P and X are natural numbers.

According to example embodiments, a method of writing data in a storage device, includes: receiving write data from a host device; monitoring an operating temperature of the storage device; dividing the write data into N sub-data, where N is a natural number greater than or equal to two; obtaining a plurality of write data blocks respectively corresponding to a plurality of storage regions of the storage device by encoding the N sub-data, the plurality of write data blocks including N data blocks and K parity blocks, where K is a natural number; based on the operating temperature being less than or equal to a first reference temperature, performing a write operation on each of the plurality of write data blocks by transmitting a write command to each of the plurality of storage regions; based on the operating temperature being higher than the first reference temperature, skipping the write operation on X write data blocks among the plurality of write data blocks and performing the write operation on only P write data blocks among the plurality of write data blocks, where X and P are natural numbers and X is less than or equal to K; and after skipping the write operation on the X write data blocks, based on a write completion request being received from the host device, the storage device being in an idle state, or the operating temperature becoming lower than a second reference temperature lower than the first reference temperature, additionally performing a subsequent write operation on the X write data blocks.

According to example embodiments, a method of writing data in a storage device, includes: receiving write data from a host device; monitoring an operating temperature of the storage device; identifying a number of a plurality of write data blocks based on the operating temperature; generating the plurality of write data blocks respectively corresponding to a plurality of storage regions of the storage device based on the write data; and performing a normal write operation in which a write operation is performed on each of the plurality of write data blocks by transmitting a write command to each of the plurality of storage regions.

BRIEF DESCRIPTION OF DRAWINGS

The above and other aspects and features will be more apparent from the following description of example embodiments, taken in conjunction with the accompanying drawings, in which.

DETAILED DESCRIPTION OF

Figure 1:
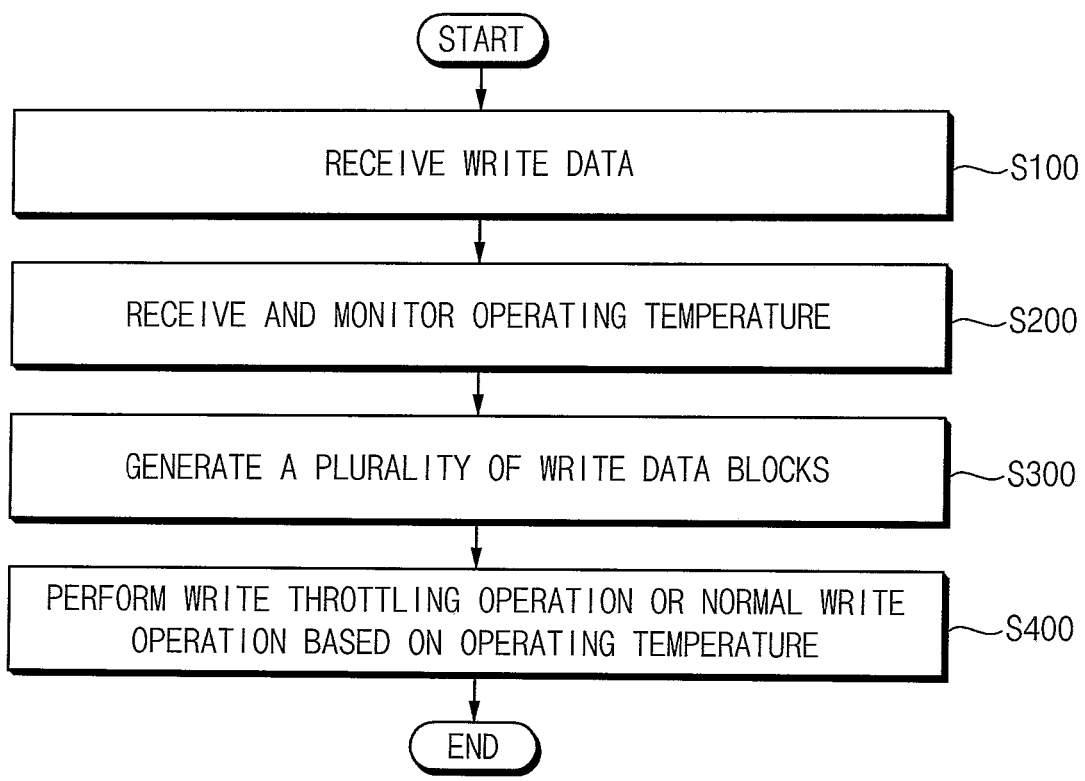
FIG. 1 is a flowchart illustrating a method of writing data in a storage device according to example embodiments.

Various example embodiments will be described more fully with reference to the accompanying drawings. The present disclosure may, however, be embodied in many different forms and should not be construed as limited to example embodiments set forth herein. Like reference numerals refer to like elements throughout.

FIG. 1 is a flowchart illustrating a method of writing data in a storage device according to example embodiments.

Referring to FIG. 1, a method of writing data in a storage device according to example embodiments is performed by a storage device that includes a storage controller and a plurality of storage regions (or areas). The plurality of storage regions may be formed by a plurality of nonvolatile memories. Configurations of the storage device and a storage system including the storage device will be described with reference to FIGS. 3 through 5.

In the method of writing data in the storage device according to example embodiments, write data to be written into the plurality of storage regions is received from a host device that is located outside the storage device (operation S100). For example, a write request and a write address (e.g., a logical address) may be received together with the write data. For example, a request received from the host device may be referred to as a host command, and the write request may be referred to as a host write command.

An operating temperature of the storage device may be received and monitored (operation S200). For example, the operating temperature may be received from a temperature sensor that is disposed inside or outside the storage device. For example, while monitoring the operating temperature, temperature profile data that represents statistical information about a change in the operating temperature may be stored and/or recorded.

A plurality of write data blocks may be generated based on the write data (operation S300). For example, the plurality of write data blocks may be generated based on an erasure coding scheme, a Redundant Array of Independent Disks (RAID) 5 scheme, a RAID 6 scheme, or the like. Operation S300 will be described with reference to FIG. 6.

A write throttling operation or a normal write operation may be performed based on the operating temperature (operation S400). Operation S400 will be described with reference to FIG. 2.

Figure 2:
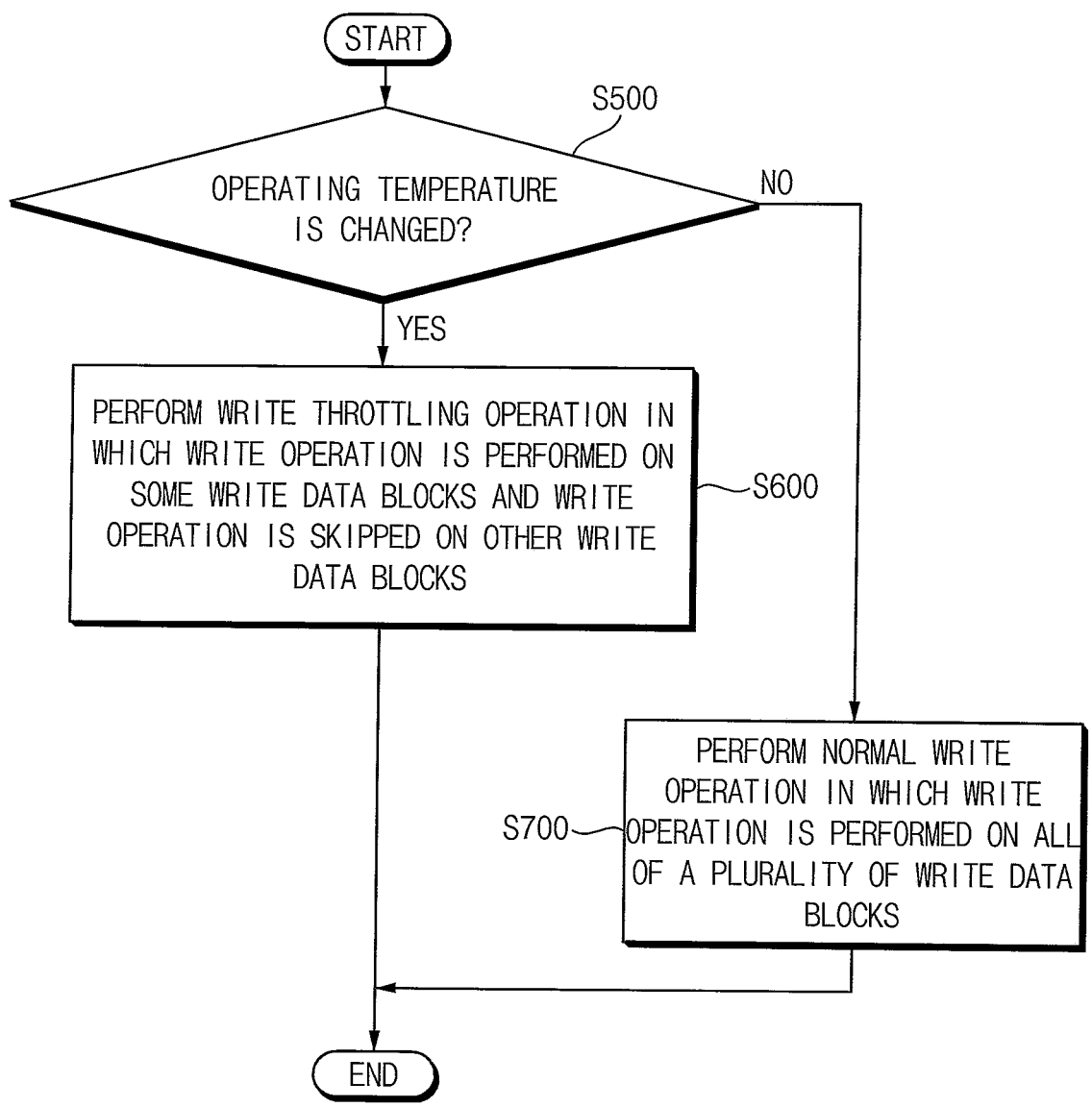
FIG. 2 is a flowchart illustrating an example of performing a write throttling operation or a normal write operation.

FIG. 2 is a flowchart illustrating an example of performing a write throttling operation or a normal write operation in FIG. 1.

Referring to FIGS. 1 and 2, in operation S400, when it is determined that the operating temperature is changed (operation S500: YES), e.g., when it is determined that the operating temperature is in a temperature range in which throttling of a write operation is required, the write throttling operation may be performed (operation S600). For example, the write throttling operation may represent an operation in which a write operation is performed on some write data blocks among the plurality of write data blocks and a write operation is skipped (or omitted) on other write data blocks among the plurality of write data blocks. The write throttling operation may be performed by transmitting a write command to some storage regions among the plurality of storage regions and by skipping an operation of transmitting a write command to other storage regions among the plurality of storage regions. For example, when the operating temperature increases, the write throttling operation may be performed.

When it is determined that the operating temperature is not changed and is maintained (operation S500: NO), e.g., when it is determined that the operating temperature is not in a temperature range in which the throttling of the write operation is required and when it is determined that a temperature control is unnecessary even when the write operation is performed on all data blocks, the normal write operation may be performed (operation S700). For example, the normal write operation may represent an operation in which a write operation is performed on all of the plurality of write data blocks. The normal write operation may be performed by transmitting a write command to all of the plurality of storage regions.

For example, one write data block may be transmitted to and written into one storage region, and a write command and a write address (e.g., a physical address) may be transmitted together with the write data block. For example, a command transmitted to the storage region may be referred to as a memory command, and the write command may be referred to as a memory write command.

Due to increased performance of a storage system, and an operating temperature and power consumption of may increase when a data write operation is performed. The increase in operating temperature may affect read performance, write performance and reliability of the storage device. Thus, a throttling operation for protecting the storage system may be used to reduce the operating temperature.

When the storage device normally operates, the write operation may be performed on all of the plurality of write data blocks that are generated based on the write data, as in operation S700.

In the method of writing data in the storage device according to example embodiments, the write operation may be performed on some write data blocks among the plurality of write data blocks and the write operation may be skipped on other write data blocks among the plurality of write data blocks, based on the change in the operating temperature of the storage device. In addition, when a predetermined condition (or criterion) is subsequently satisfied, an additional write operation may be performed on the write data block on which the write operation is skipped. Accordingly, the degradation or deterioration of data write performance may be relatively small, the storage device may recover to normal operating temperature relatively quickly, and thus the storage device may have improved or enhanced data write performance and/or efficiency.

Figure 3:
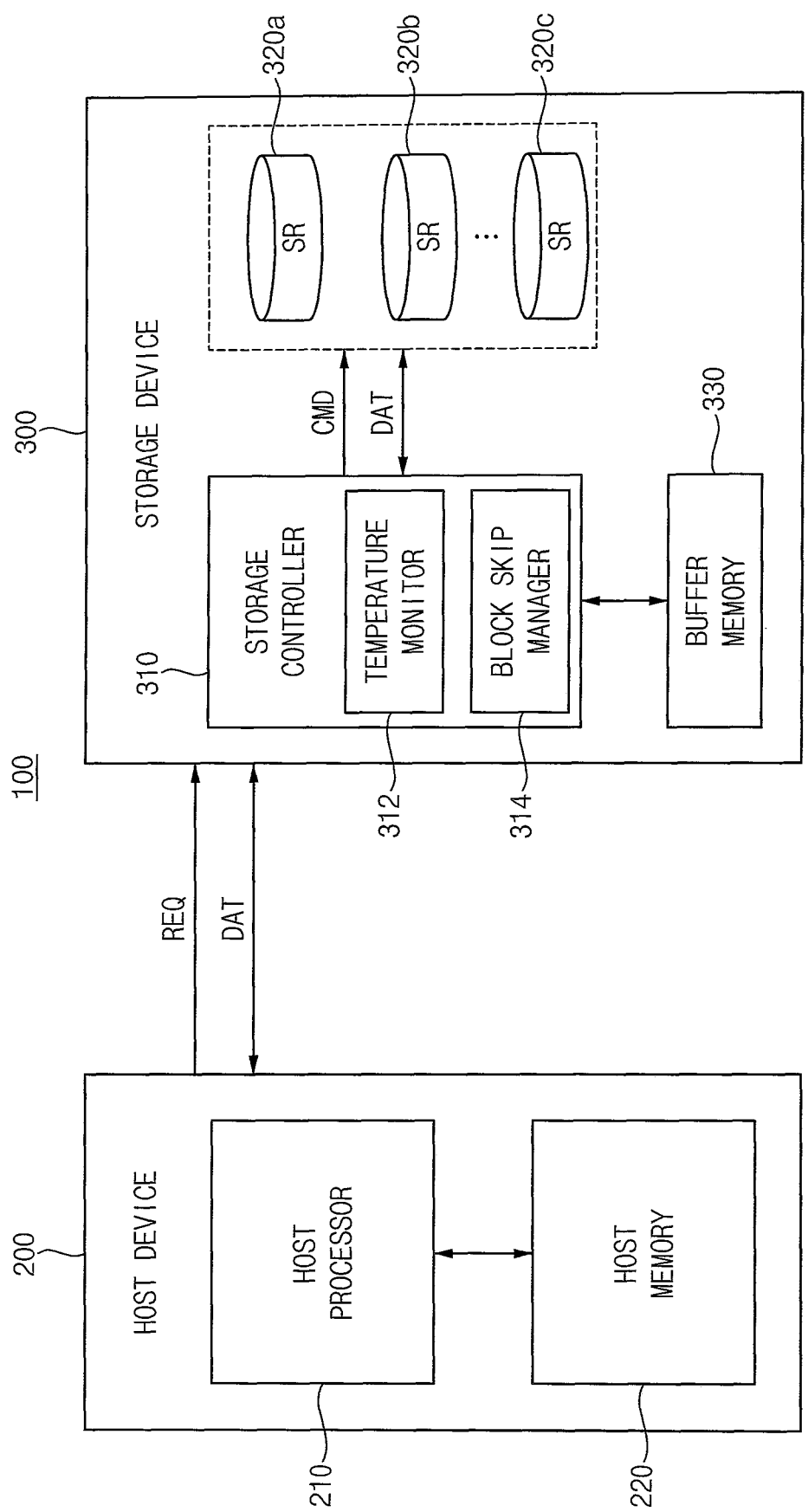
FIG. 3 is a block diagram illustrating a storage device and a storage system including the storage device according to example embodiments.

FIG. 3 is a block diagram illustrating a storage device and a storage system including the storage device according to example embodiments.

Referring to FIG. 3, a storage system 100 includes a host device 200 and a storage device 300.

The host device 200 may control overall operations of the storage system 100. The host device 200 may include a host processor 210 and a host memory 220.

The host processor 210 may control an operation of the host device 200. For example, the host processor 210 may execute an operating system (OS). For example, the operating system may include a file system for file management and a device driver for controlling peripheral devices including the storage device 300 at the operating system level. The host memory 220 may store instructions and/or data that are executed and/or processed by the host processor 210.

The storage device 300 may be accessed by the host device 200. The storage device 300 may include a storage controller 310, a plurality of storage regions (SRs) 320a, 320b and 320c, and a buffer memory 330.

The storage controller 310 may control an operation of the storage device 300. For example, the storage controller 310 may control the operation (e.g., a write operation) of the storage device 300 and may control an operation of exchanging data DAT (e.g., receiving and storing write data) between the host device 200 and the storage device 300, based on a request REQ (e.g., a write request) received from the host device 200. For example, the storage controller 310 may generate a command (e.g., a write command) for controlling operations (e.g., a write operation) of the plurality of storage regions 320a to 320c, may transmit the command to the plurality of storage regions 320a to 320c, and may control an operation of exchanging data DAT (e.g., transmitting and programming write data) with the plurality of storage regions 320a to 320c.

The plurality of storage regions 320a to 320c may be controlled by the storage controller 310, and may store a plurality of data. For example, the plurality of storage regions 320a to 320c may store meta data, user data, or the like. For example, each of the plurality of storage regions 320a to 320c may include one or more nonvolatile memories.

In some example embodiments, the nonvolatile memory may include a NAND flash memory. In other example embodiments, the nonvolatile memory may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 330 may store instructions and/or data that are executed and/or processed by the storage controller 310, and may temporarily store data stored in or to be stored into the plurality of storage regions 320a to 320c. For example, the buffer memory 330 may include at least one of various volatile memories, e.g., a static random access memory (SRAM), a dynamic random access memory (DRAM), or the like. In some example embodiments, the buffer memory 330 may be included in the storage controller 310.

The storage controller 310 may perform the method of writing data in the storage device according to example embodiments described with reference to FIGS. 1 and 2. For example, the storage controller 310 may receive write data from the host device 200, may receive and monitor an operating temperature of the storage device 300, may generate a plurality of write data blocks based on the write data, and may perform a write throttling operation or a normal write operation based on the operating temperature.

To perform writing data in the storage device according to example embodiments described with reference to FIGS. 1 and 2, the storage controller 310 may include a temperature monitor 312 and a block skip manager 314.

The temperature monitor 312 may receive and monitor the operating temperature. In other words, the temperature monitor 312 may perform operation S200 in FIG. 1. For example, the operating temperature may be received from a temperature sensor. In some example embodiments, the temperature sensor may be disposed (or located) inside the temperature monitor 312, may be disposed outside the temperature monitor 312 and inside the storage controller 310, or may be disposed outside the storage controller 310.

When the write throttling operation is performed, the block skip manager 314 may determine the number of write data blocks on which the write operation is to be skipped among the plurality of write data blocks, and may select the write data blocks on which the write operation is to be skipped. In other words, the block skip manager 314 may perform operation S600 in FIG. 2.

In addition, the storage controller 310 may perform a method of writing data in a storage device according to example embodiments, which will be described with reference to FIGS. 30 and 33.

In some example embodiments, the storage device 300 may be a solid state drive (SSD), a universal flash storage (UFS), a multi-media card (MMC) or an embedded multi-media card (eMMC). In other example embodiments, the storage device 300 may be one of a secure digital (SD) card, a micro SD card, a memory stick, a chip card, a universal serial bus (USB) card, a smart card, a compact flash (CF) card, or the like.

In some example embodiments, the storage device 300 may be connected to the host device 200 via a block accessible interface which may include, for example, a UFS, an eMMC, a nonvolatile memory express (NVMe) bus, a small computer small interface (SCSI) bus, a serial attached SCSI (SAS) bus, a universal serial bus (USB), a peripheral component interconnect (PCI) express (PCIe) bus, an advanced technology attachment (ATA) bus, a parallel ATA (PATA) bus, a serial ATA (SATA) bus, a compute express link (CXL) bus, or the like. The storage device 300 may use a block accessible address space corresponding to an access size of the plurality of storage regions 320a to 320c to provide the block accessible interface to the host device 200, for allowing the access by units of a memory block with respect to data stored in the plurality of storage regions 320a to 320c.

In some example embodiments, the storage system 100 may be any computing system, such as a personal computer (PC), a server computer, a data center, a workstation, a digital television, a set-top box, a navigation system, etc. In other example embodiments, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Figure 4:
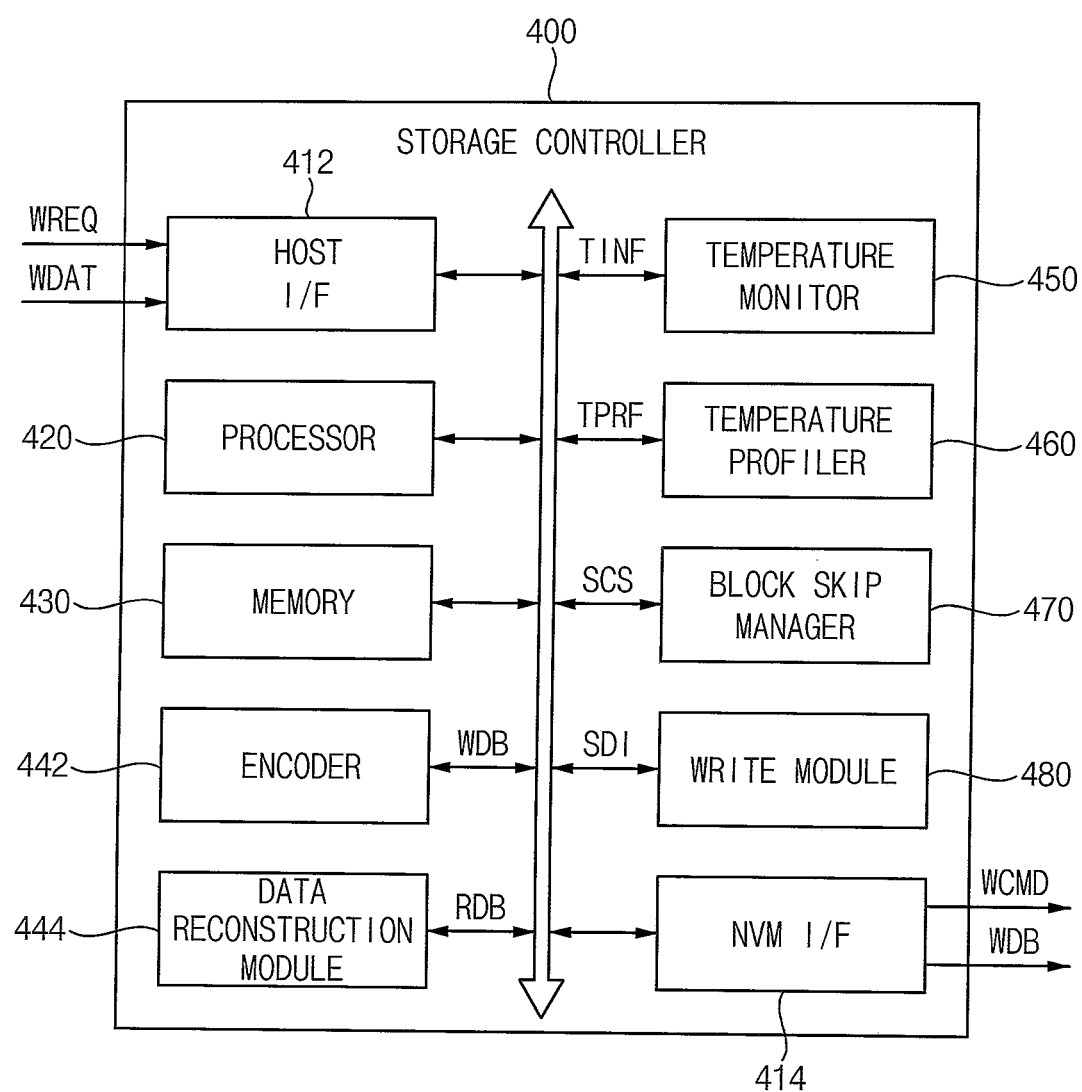
FIG. 4 is a block diagram illustrating an example of a storage controller included in a storage device according to example embodiments.

FIG. 4 is a block diagram illustrating an example of a storage controller included in a storage device according to example embodiments.

Referring to FIG. 4, a storage controller 400 may include a host interface (I/F) 412, a nonvolatile memory (NVM) interface 414, a processor 420, a memory 430, an encoder 442, a data reconstruction module 444, a temperature monitor 450, a temperature profiler 460, a block skip manager 470 and a write module 480.

The host interface 412 may provide physical connections between a host device and a storage device (e.g., the host device 200 and the storage device 300 in FIG. 3). The host interface 412 may provide an interface corresponding to a bus format of the host device for communication between the host device and the storage device. For example, from the host device, the host interface 412 may receive a write request WREQ and write data WDAT to be written into the storage device.

The nonvolatile memory interface 414 may exchange data with a plurality of storage regions (e.g., the plurality of storage regions 320a to 320c in FIG. 3) of the storage device. For example, the nonvolatile memory interface 414 may transmit a write command WCMD that corresponds to the write request WREQ and a plurality of write data blocks WDB that are generated based on the write data WDAT to the plurality of storage regions. For example, the nonvolatile memory interface 414 may be configured to comply with a standard protocol, such as Toggle or open NAND flash interface (ONFI).

The processor 420 may control an operation of the storage controller 400 in response to a request (e.g., the write request WREQ) received via the host interface 412 from the host device. For example, the processor 420 may control an operation of the storage device, and may control respective components by employing firmware for operating the storage device.

The memory 430 may store instructions and data executed and processed by the processor 420. For example, the memory 430 may be implemented with a volatile memory, such as a DRAM, a SRAM, a cache memory, or the like.

During a data write operation (e.g., in the method of writing data in the storage device according to example embodiments), the encoder 442 may generate the plurality of write data blocks WDB based on the write data WDAT received from the host device. For example, the plurality of write data blocks WDB may be generated based on the erasure coding scheme, the RAID 5 scheme, the RAID 6 scheme, or the like. An operation of generating the plurality of write data blocks WDB will be described with reference to FIG. 7A.

During a data read operation, the data reconstruction module 444 may generate read data based on data blocks retrieved from the plurality of storage regions. In addition, during the data write operation (e.g., in the method of writing data in the storage device according to example embodiments), the data reconstruction module 444 may generate a reconstructed data block RDB by reconstructing (or restoring or recovering) the data block in which the write operation is skipped as the write throttling operation is performed. An operation of generating the read data will be described with reference to FIG. 7B, and an operation of generating the reconstructed data block RDB will be described with reference to FIGS. 25A and 25B.

The temperature monitor 450 may be substantially the same as the temperature monitor 312 in FIG. 3. During the data write operation (e.g., in the method of writing data in the storage device according to example embodiments), the temperature monitor 450 may receive and monitor temperature information TINF representing an operating temperature of the storage device. In some example embodiments, the temperature information TINF may be internally received from a temperature sensor included in the temperature monitor 450, and/or may be received from a temperature sensor disposed outside the temperature monitor 450 or outside the storage controller 400.

During the data write operation (e.g., in the method of writing data in the storage device according to example embodiments), the temperature profiler 460 may store and/or record temperature profile data TPRF representing statistical information about a change in the operating temperature based on the temperature information TINF.

The block skip manager 470 may be substantially the same as the block skip manager 314 in FIG. 3. During the data write operation (e.g., in the method of writing data in the storage device according to example embodiments), when the write throttling operation is performed, the block skip manager 470 may determine the number (or quantity) of write data blocks on which the write operation is to be skipped, may select the write data blocks on which the write operation is to be skipped from among the plurality of write data blocks WDB, and may generate a skip control signal SCS representing the number of write data blocks on which the write operation is to be skipped and the selected write data blocks on which the write operation is to be skipped from among the plurality of write data blocks WDB.

The write module 480 may control the data write operation of the storage device. In addition, during the data write operation (e.g., in the method of writing data in the storage device according to example embodiments), when the write throttling operation is performed, the write module 480 may generate skipped data information SDI associated with or related to the selected write data block on which the write operation is to be skipped from among the plurality of write data blocks WDB.

The storage controller 400 may further include an error correction code (ECC) engine for error correction, an advanced encryption standard (AES) engine for data encryption/decryption, and/or the like.

Figure 5:
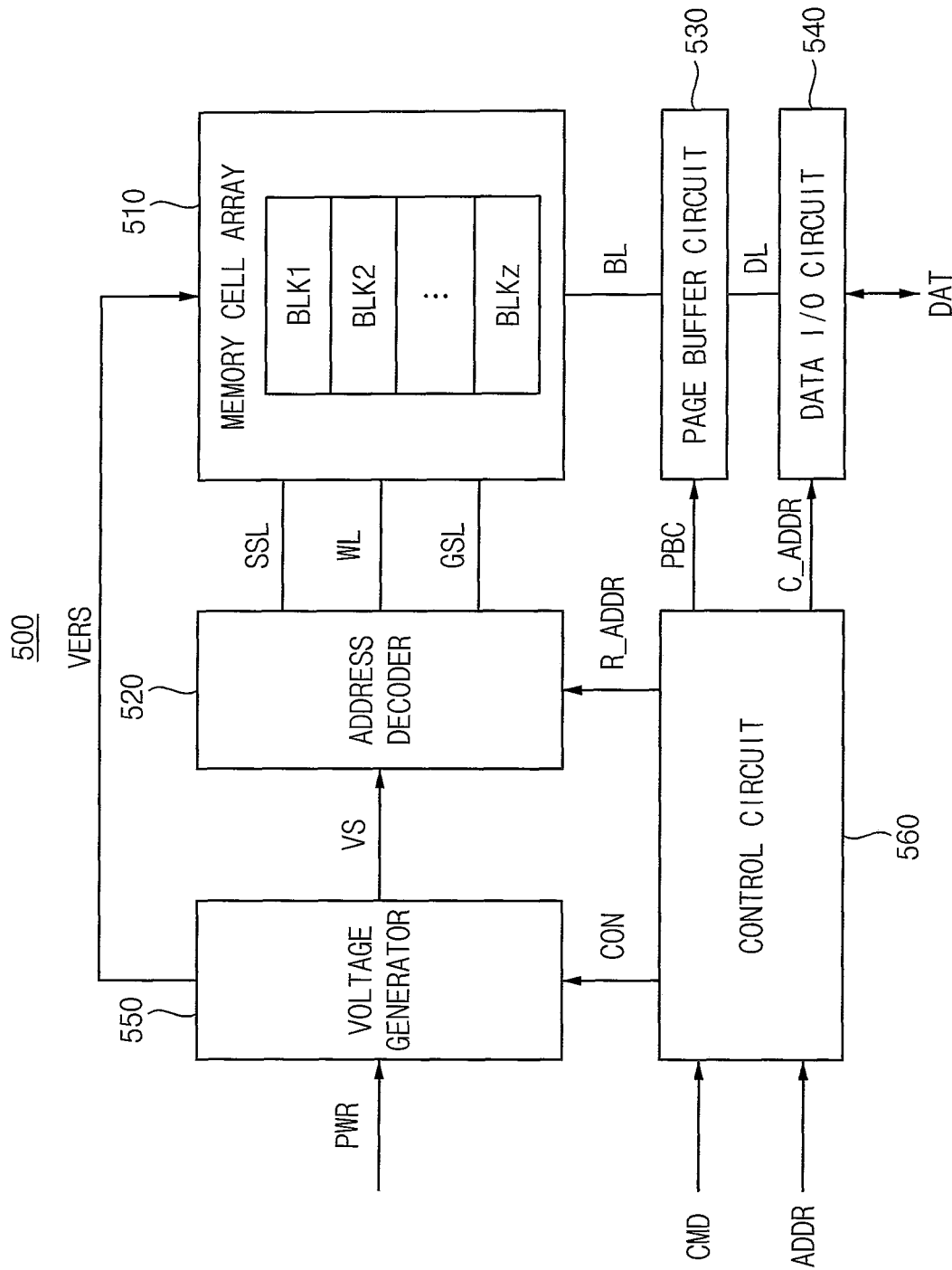
FIG. 5 is a block diagram illustrating an example of a nonvolatile memory included in a storage device according to example embodiments.

FIG. 5 is a block diagram illustrating an example of a nonvolatile memory included in a storage device according to example embodiments.

Referring to FIG. 5, a nonvolatile memory 500 includes a memory cell array 510, an address decoder 520, a page buffer circuit 530, a data input/output (I/O) circuit 540, a voltage generator 550 and a control circuit 560. One storage region may be formed or provided by one or more nonvolatile memories.

The memory cell array 510 may be connected to the address decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1 to BLKz may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may include a charge trap layer.

The control circuit 560 may receive a command CMD and an address ADDR from an outside (e.g., from the storage controller 310 in FIG. 3), and control erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recovery read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL. For example, in the data erase/write/read operations, the address decoder 520 may determine at least one of the plurality of wordlines WL as a selected wordline, may determine at least one of the plurality of string selection lines SSL as a selected string selection line, and may determine at least one of the plurality of ground selection lines GSL as a selected ground selection line, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

The page buffer circuit 530 may be connected to the memory cell array 510 via the plurality of bitlines BL. The page buffer circuit 530 may include a plurality of page buffers. The page buffer circuit 530 may store data DAT to be programmed into the memory cell array 510 or may read data DAT sensed from the memory cell array 510. In other words, the page buffer circuit 530 may operate as a write driver or a sensing amplifier depending on an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Figure 6:
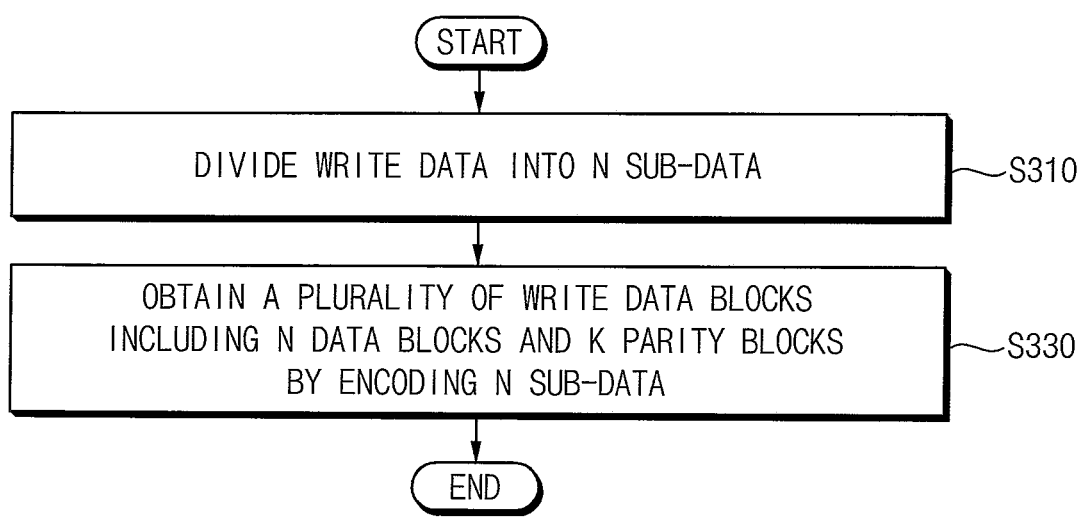
FIG. 6 is a flowchart illustrating an example of generating a plurality of write data blocks in FIG. 1.
Figure 7A:
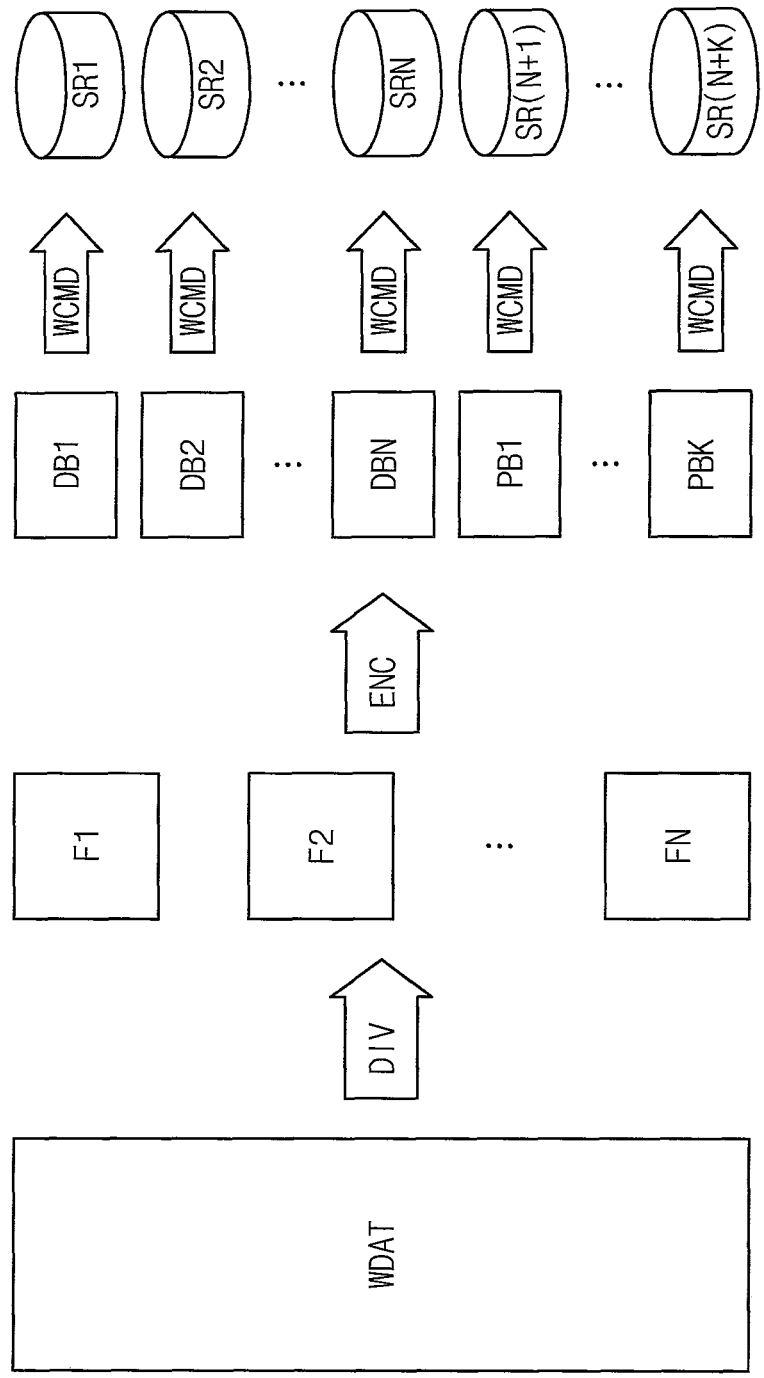
FIGS. 7A and 7B are diagrams for describing an operation of FIG. 6 according to example embodiments.
Figure 7B:
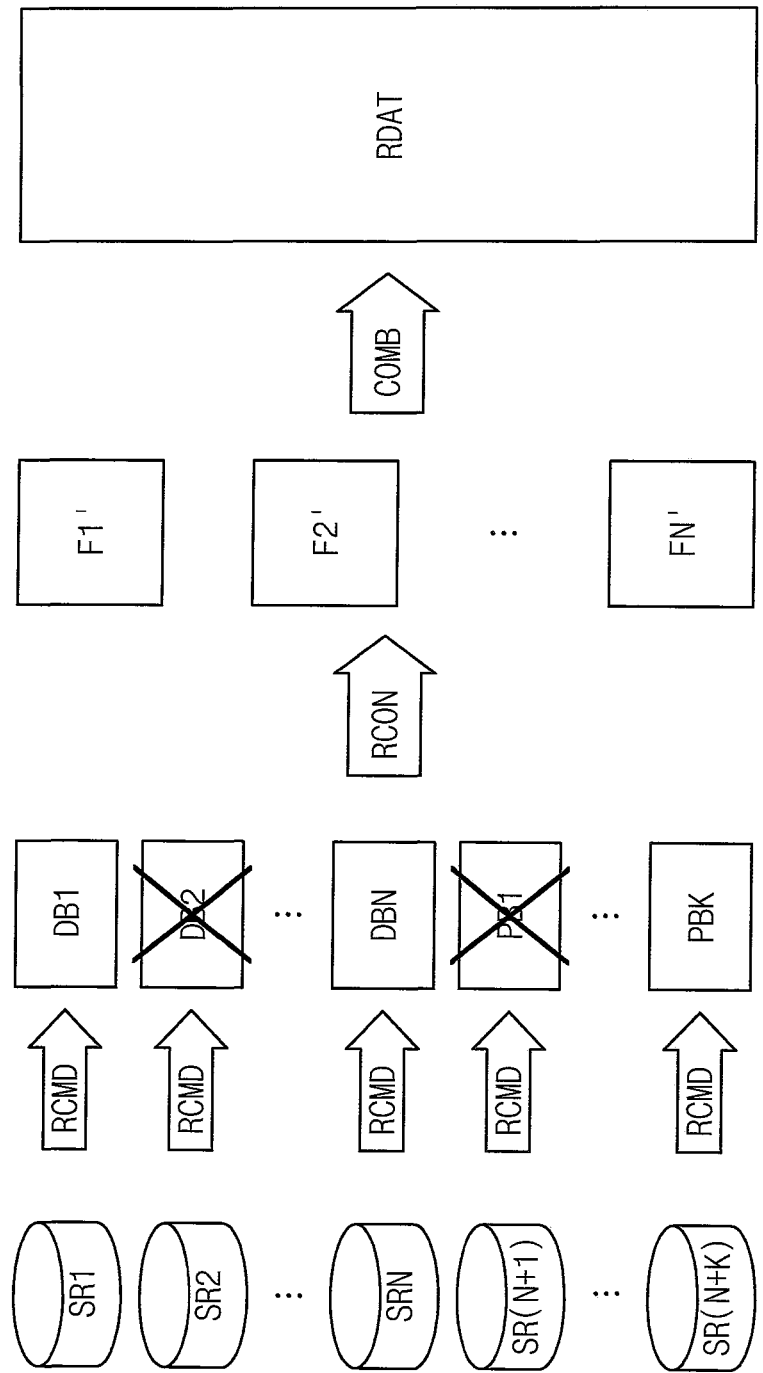

FIG. 6 is a flowchart illustrating an example of generating a plurality of write data blocks in FIG. 1. FIGS. 7A and 7B are diagrams for describing an operation of FIG. 6.

Referring to FIGS. 1, 6 and 7A, in operation S300, the write data may be divided into N sub-data, where N is a natural number greater than or equal to two (operation S310). For example, as illustrated in FIG. 7A, N sub-data F1, F2, . . . , FN may be generated by performing a data dividing (or striping) operation DIV on the write data WDAT. For example, the write data WDAT may correspond to one file or one data object.

The plurality of write data blocks that include N data blocks and K parity blocks may be obtained by encoding the N sub-data, where K is a natural number (operation S330). For example, as illustrated in FIG. 7A, N data blocks DB1, DB2, . . . , DBN and K parity blocks PB1, . . . , PBK may be generated by performing an encoding operation ENC on the N sub-data F1 to FN.

Operations S310 and S330 may be performed by the encoder 442 in FIG. 4.

When the normal write operation is performed after operations S310 and S330 are performed, all of the N data blocks DB1 to DBN and the K parity blocks PB1 to PBK may be written into (N+K) storage regions SR1, SR2, . . . , SRN, SR(N+1), . . . , SR(N+K) by transmitting the write command WCMD to all of the storage regions SR1 to SR(N+K) and by transmitting all of the data blocks DB1 to DBN and the parity blocks PB1 to PBK to the storage regions SR1 to SR(N+K). For example, the storage regions SR1 to SR(N+K) may be included in one or more storage devices. For example, one storage region may correspond to one storage device, or one storage region may correspond to two or more storage regions.

In some example embodiments, the operation described with reference to FIGS. 6 and 7A may be performed based on the erasure coding scheme, the RAID 5 scheme, the RAID 6 scheme, or the like.

In coding theory, an erasure code is a forward error correction (FEC) code under the assumption of bit erasures (rather than bit errors), which transforms a message of K symbols into a longer message (code word) with N symbols such that the original message can be recovered or reconstructed from a subset of the N symbols. In other words, even if an error or defect occurs on K symbols among (N+K) symbols, the original message can be recovered with only N symbols. For example, encoding may be performed using Reed-Solomon code, Tahoe-LAFS (Least-Authority File Store), Weaver code, or the like.

RAID is a data storage virtualization technology that combines multiple physical disk drive components into one or more logical units for the purposes of data redundancy, performance improvement, or both. Data is distributed across the drives in one of several ways, referred to as RAID levels, depending on the required level of redundancy and performance. RAID 5 consists of block-level striping with distributed parity, and RAID 6 consists of block-level striping with double distributed parity.

Referring to FIG. 7B, an example of the data read operation is illustrated after the normal write operation is performed on the data blocks DB1 to DBN and PB1 to PBK as illustrated in FIG. 7A.

For example, based on a read command RCMD transmitted to all of the storage regions SR1 to SR(N+K), all of the data blocks DB1 to DBN and the parity blocks PB1 to PBK may be read from the storage regions SR1 to SR(N+K). Next, N sub-data F1', F2', . . . , FN' may be generated by performing a data reconstruction operation RCON based on the data blocks DB1 to DBN and the parity blocks PB1 to PBK. Thereafter, read data RDAT may be generated by performing a combining operation COMB on the N sub-data F1' to FN'.

As described above, when the erasure coding is used, applied or employed, the original data may be normally reconstructed even if an error occurs on a maximum of K blocks among the N data blocks DB1 to DBN and the K parity blocks PB1 to PBK. FIG. 7B illustrates an example where an error occurs on the data block DB2 and the parity block PB1, and in this case, the original data may be normally reconstructed if K is greater than or equal to two (i.e., the number of blocks where an error has occurred). Therefore, when K is greater than or equal to two in the example of FIG. 7B, the sub-data F1' to FN' and the read data RDAT may be substantially the same as the sub-data F1 to FN and the write data WDAT in FIG. 7A, respectively.

Figure 8:
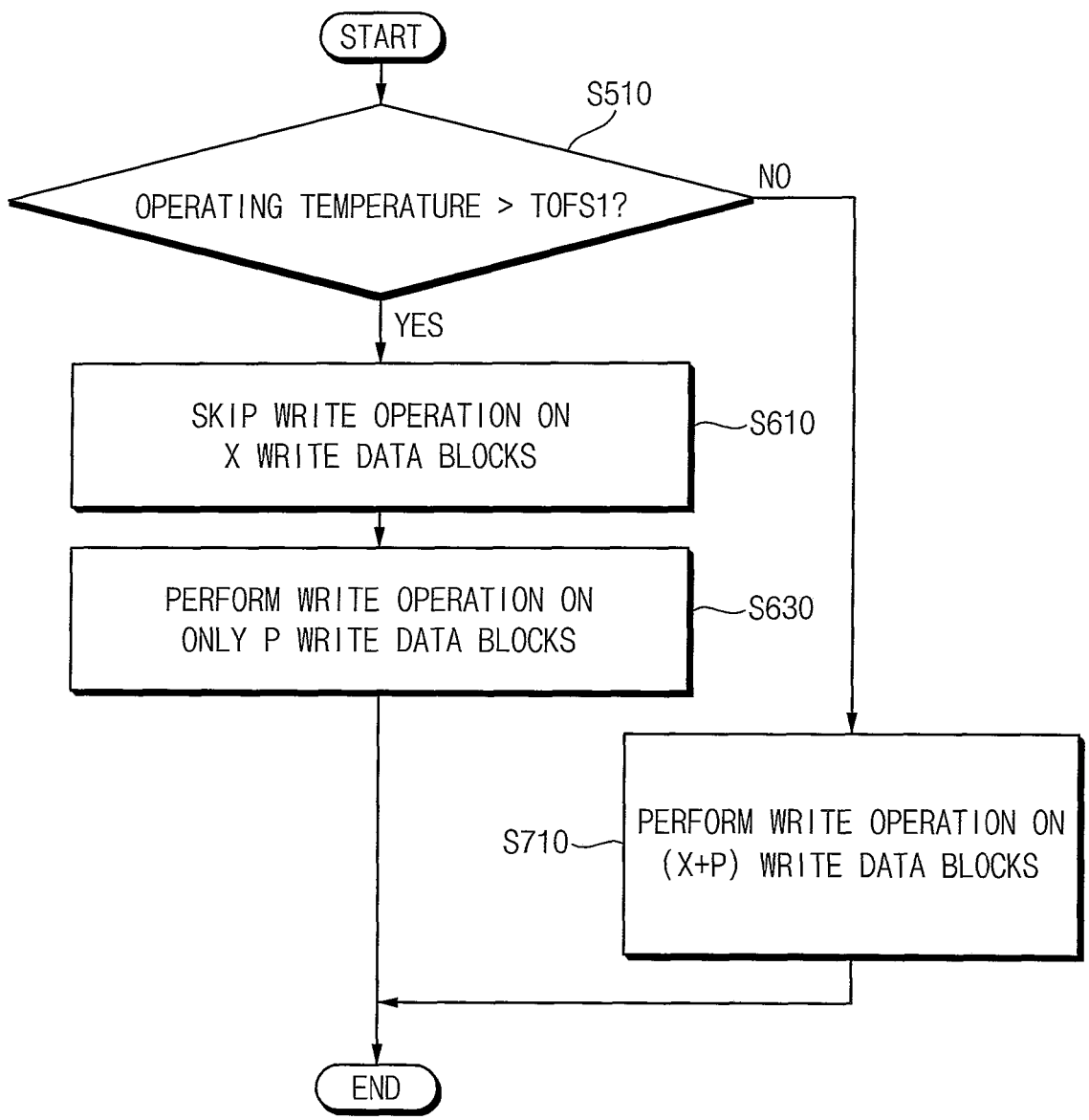
FIG. 8 is a flowchart illustrating an example of performing a write throttling operation or a normal write operation of FIG. 2.

FIG. 8 is a flowchart illustrating an example of performing a write throttling operation or a normal write operation of FIG. 2.

Referring to FIGS. 2 and 8, in operation S500, the operating temperature may be compared with a first reference temperature TOFS1 (operation S510). In other words, it may be determined, based on the first reference temperature TOFS1, whether the operating temperature is changed or maintained. The first reference temperature TOFS1 may be referred to as offset temperature, thermal management temperature, threshold temperature or the like.

When the operating temperature becomes higher than the first reference temperature TOFS1 (operation S510: YES), the write throttling operation of operation S600 may be performed. When the operating temperature is lower than or equal to the first reference temperature TOFS1 (operation S510: NO), the normal write operation of operation S700 may be performed.

In operation S600, a write operation may be skipped on X write data blocks among the plurality of write data blocks corresponding to the write data WDAT, where X is a natural number (operation S610), and a write operation may be performed only on P write data blocks among the plurality of write data blocks corresponding to the write data WDAT, where P is a natural number (operation S630). For example, as described with reference to FIG. 6, when the plurality of write data blocks including the N data blocks and the K parity blocks are obtained based on the write data WDAT by operation S300, up to K blocks of the plurality of blocks corresponding to the write data WDAT may be blocked. For example, (X+P) may be equal to (N+K). For example, X, which represents the number (or quantity) of write data blocks on which the write operation is to be skipped during the write throttling operation among the plurality of write data blocks, may be less than or equal to K, which represents the number of parity blocks.

In some example embodiments, P, which represents the number (or quantity) of write data blocks on which the write operation is performed, may be less than or equal to (N+K−X). For example, when X is less than K, P may be less than or equal to (N+K−X).

In operation S700, a write operation may be performed on (X+P) write data blocks (e.g., all of the plurality of write data blocks) (operation S710).

Figure 9:
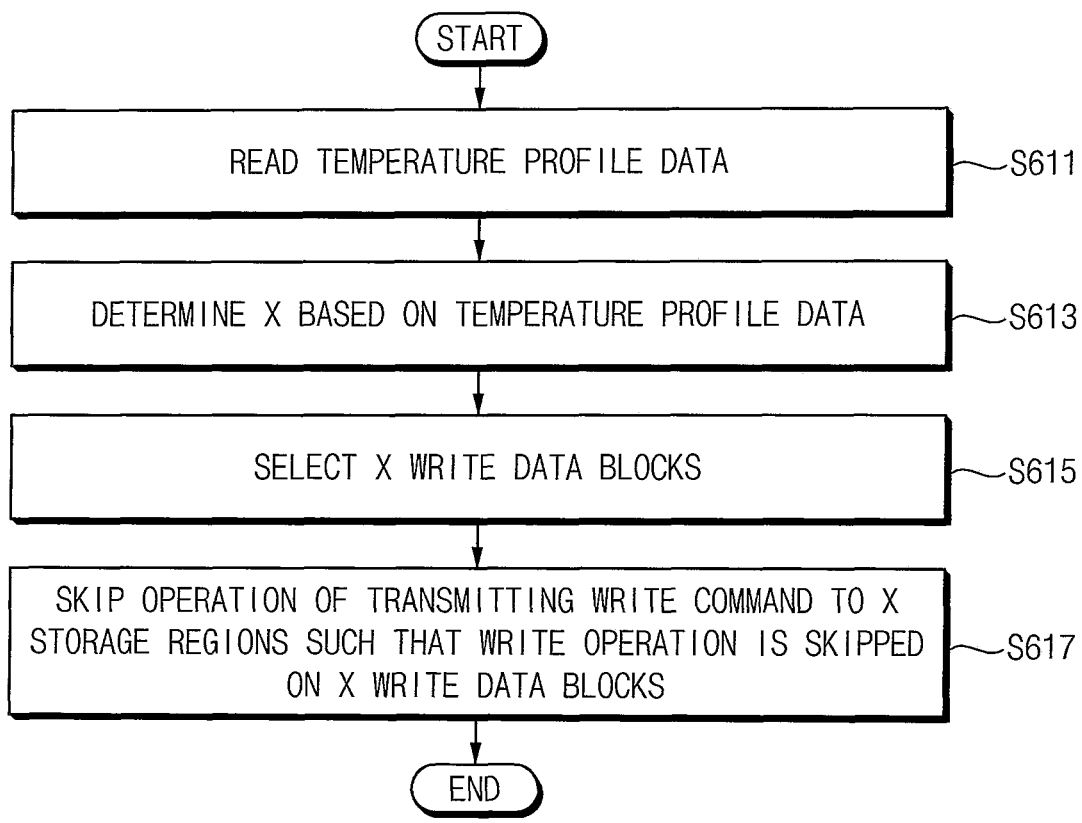
FIG. 9 is a flowchart illustrating an example of skipping a write operation on X write data blocks in FIG. 8.

FIG. 9 is a flowchart illustrating an example of skipping a write operation on X write data blocks in FIG. 8.

Referring to FIGS. 8 and 9, in operation S610, temperature profile data for the operating temperature may be read (operation S611). For example, the temperature profiler 460 in FIG. 4 may have or store the temperature profile data TPRF representing how many write data blocks to skip the write operation at a specific temperature by profiling temperature information at the time of write operation.

Based on the temperature profile data, X, representing the number of write data blocks on which the write operation is to be skipped, may be determined (operation S613). For example, based on the temperature profile data, the number of write data blocks on which the write operation is to be skipped may be changeable or adjustable. Therefore, X may be determined based on the temperature profile data.

The X write data blocks may be selected from among the plurality of write data blocks corresponding to the write data WDAT (operation S615). For example, the X write data blocks may be selected based on various criteria. Operation S615 will be described with reference to FIGS. 14 through 20.

An operation of transmitting a write command to X storage regions among the plurality of storage regions may be skipped such that the write operation is skipped on the X write data blocks (operation S617). The X storage regions may correspond to the X write data blocks. For example, the X write data blocks may not be physically programmed.

Operations S613 and S615 may be performed by the block skip manager 470 in FIG. 4, and operation S617 may be performed by the write module 480 in FIG. 4.

Figure 10:
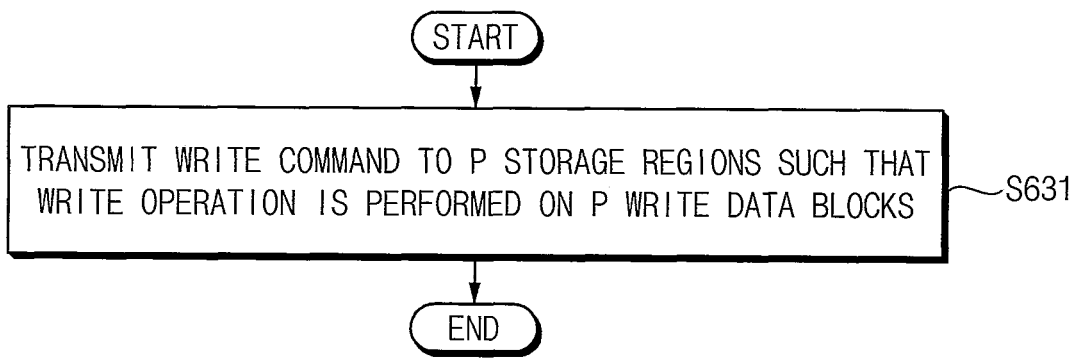
FIG. 10 is a flowchart illustrating an example of performing a write operation on only P write data blocks in FIG. 8.

FIG. 10 is a flowchart illustrating an example of performing a write operation on only P write data blocks in FIG. 8.

Referring to FIGS. 8 and 10, in operation S630, a write command may be transmitted to P storage regions among the plurality of storage regions such that the write operation is performed on the P write data blocks (operation S631). The P storage regions may correspond to the P write data blocks.

Operation S631 may be performed by the write module 480 in FIG. 4.

Figure 11A:
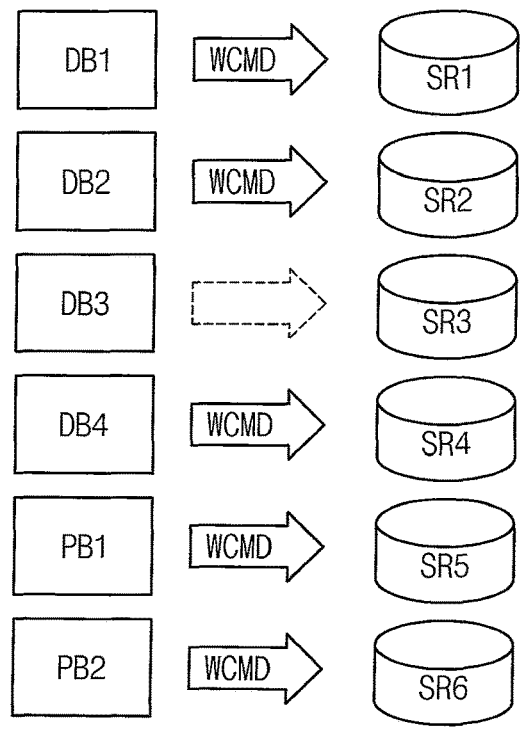
FIGS. 11A and 11B are diagrams for describing operations of FIGS. 9 and 10 according to example embodiments.
Figure 11B:
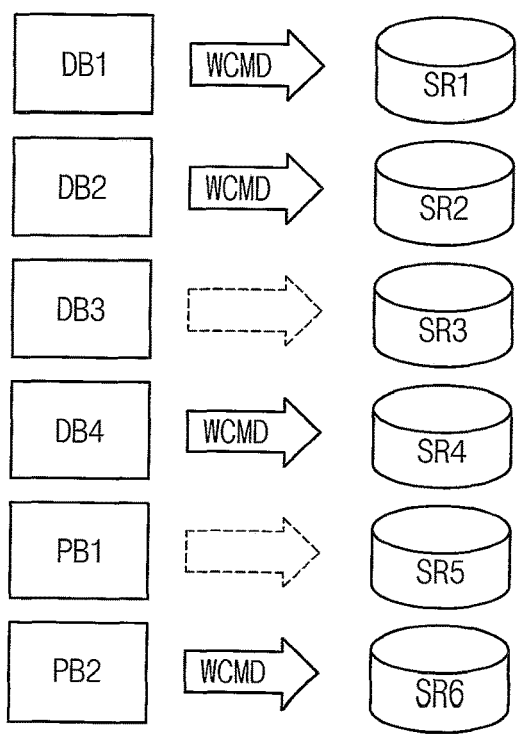

FIGS. 11A and 11B are diagrams for describing operations of FIGS. 9 and 10.

Referring to FIGS. 11A and 11B, an example of operations of FIGS. 9 and 10 is illustrated when four data blocks DB1, DB2, DB3 and DB4 and two parity blocks PB1 and PB2 are generated by operations S310 and S330 in FIG. 6, e.g., when N=4 and K=2.

For example, as illustrated in FIG. 11A, the number of write data blocks on which the write operation is to be skipped (X) may be determined to be one based on the temperature profile data, and the data block DB3 may be selected as a write data block on which the write operation is to be skipped. Thus, the write command WCMD may be transmitted to storage regions SR1, SR2, SR4, SR5 and SR6, and the data blocks DB1, DB2, DB4 and the parity blocks PB1 and PB2 may be written into the storage regions SR1, SR2, SR4, SR5 and SR6. In addition, the write command WCMD may not be transmitted to a storage region SR3, and the write operation may be skipped on the data block DB3.

For another example, as illustrated in FIG. 11B, the number of write data blocks on which the write operation is to be skipped (X) may be determined to be two based on the temperature profile data, and the data block DB3 and the parity block PB1 may be selected as write data blocks on which the write operation is to be skipped. Thus, the write command WCMD may be transmitted to the storage regions SR1, SR2, SR4 and SR6, and the data blocks DB1, DB2, DB4 and the parity block and PB2 may be written into the storage regions SR1, SR2, SR4 and SR6. In addition, the write command WCMD may not be transmitted to the storage regions SR3 and SR5, and the write operation may be skipped on the data block DB3 and the parity block PB1.

In some example embodiments, the number of write data blocks on which the write operation is skipped may be finely adjusted by profiling the change in the operating temperature while the write operation is skipped on the write data block. For example, the fine adjustment may be performed in consideration of a correlation between the number of write data blocks on which the write operation is skipped and the operating temperature. For example, the operations of FIGS. 11A and 11B may be selectively performed by the fine adjustment.

In some example embodiments, the number (e.g., X) of write data blocks on which the write operation is skipped may be less than or equal to the number (e.g., K) of parity blocks. In the examples of FIGS. 11A and 11B, K=2, and thus X=1 or X=2.

Figure 12:
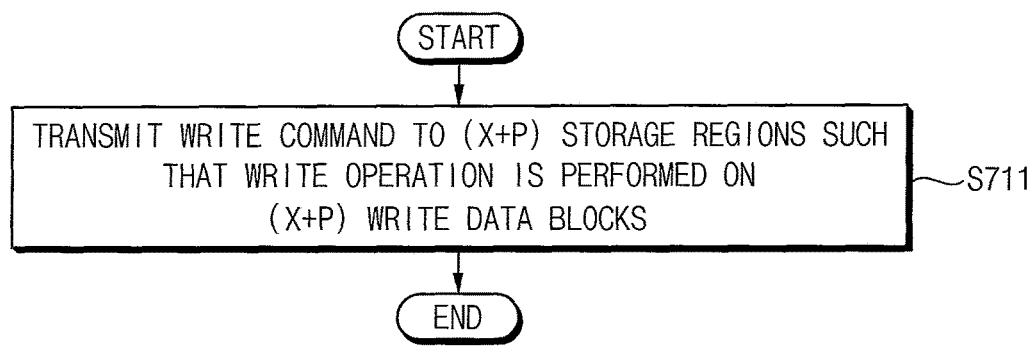
FIG. 12 is a flowchart illustrating an example of performing a write operation on (X+P) write data blocks in FIG. 8.

FIG. 12 is a flowchart illustrating an example of performing a write operation on all write data blocks corresponding to the write data WDAT, that is (X+P) write data blocks, in FIG. 8.

Referring to FIGS. 8 and 12, in operation S710, a write command may be transmitted to (X+P) storage regions (e.g., all of the plurality of storage regions) such that the write operation is performed on the (X+P) write data blocks (operation S711). The (X+P) storage regions may correspond to the (X+P) write data blocks.

Operations S711 may be performed by the write module 480 in FIG. 4.

Figure 13:
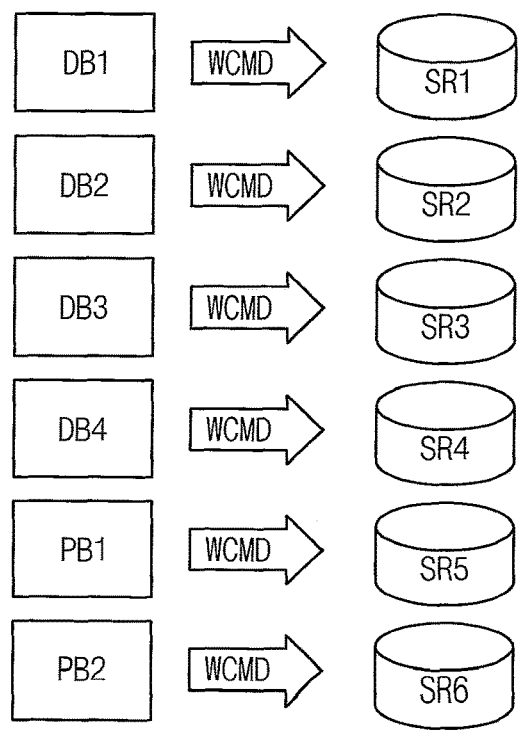
FIG. 13 is a diagram for describing an operation of FIG. 12 according to example embodiments.

FIG. 13 is a diagram for describing an operation of FIG. 12. The descriptions repeated with FIGS. 11A and 11B will be omitted.

Referring to FIG. 13, the write command WCMD may be transmitted to all of the storage regions SR1, SR2, SR3, SR4, SR5 and SR6, and all of the data blocks DB1, DB2, DB3 and DB4 and the parity blocks PB1 and PB2 may be written into the storage regions SR1, SR2, SR3, SR4, SR5 and SR6.

Figures 14, 15:
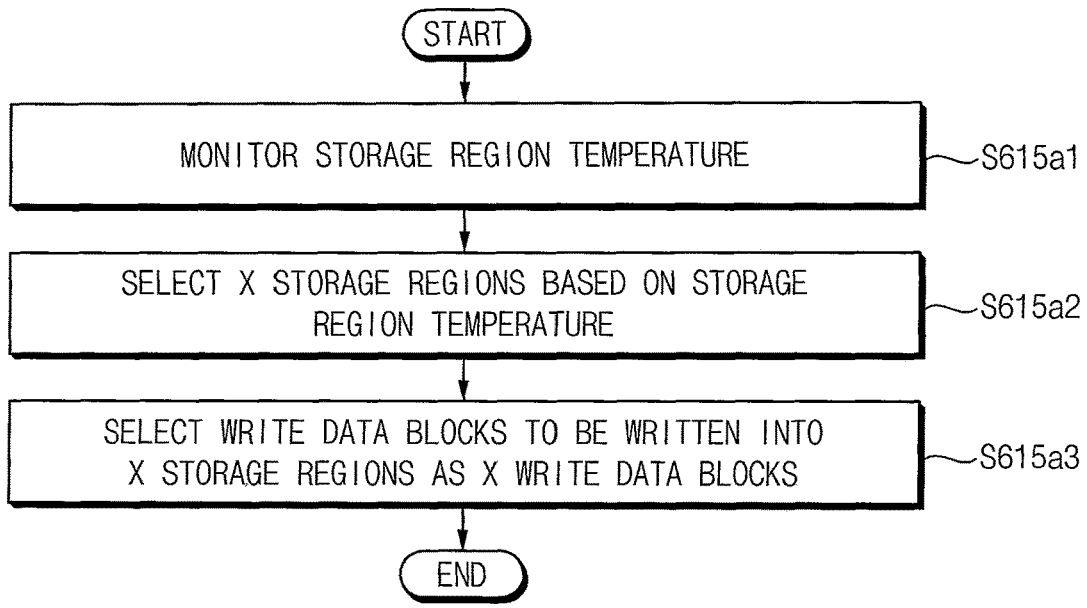
FIG. 14 is a flowchart illustrating an example of selecting X write data blocks in FIG. 9.
FIG. 15 is a diagram for describing an operation of FIG. 14 according to example embodiments.

FIG. 14 is a flowchart illustrating an example of selecting X write data blocks in FIG. 9. FIG. 15 is a diagram for describing an operation of FIG. 14.

Referring to FIGS. 9, 11A, 11B, 14 and 15, in operation S615, storage region temperature associated with each of the plurality of storage regions may be monitored (operation S615a1). For example, storage region temperatures TEMP_SR1, TEMP_SR2, TEMP_SR3, TEMP_SR4, TEMP_SR5 and TEMP_SR6 for the storage regions SR1 to SR6 may be monitored.

The X storage regions may be selected from among the plurality of storage regions based on the storage region temperature (operation S615a2). Write data blocks to be written into the X storage regions from among the plurality of write data blocks may be selected as the X write data blocks (operation S615a3). For example, storage regions having a relatively high storage region temperature (e.g., overheated storage regions) may be selected.

For example, the storage regions SR1 to SR6 may be sorted or arranged in descending order according to the storage region temperature. When the number of write data blocks on which the write operation is to be skipped is one (X=1), as in FIG. 11A, the storage region SR3 having the highest temperature and the data block DB3 corresponding thereto may be selected. When the number of write data blocks on which the write operation is to be skipped is two (X=2), as in FIG. 11B, two storage regions SR3 and SR5 having high temperature and the data block DB3 and the parity block PB1 corresponding thereto may be selected.

Figures 16, 17:
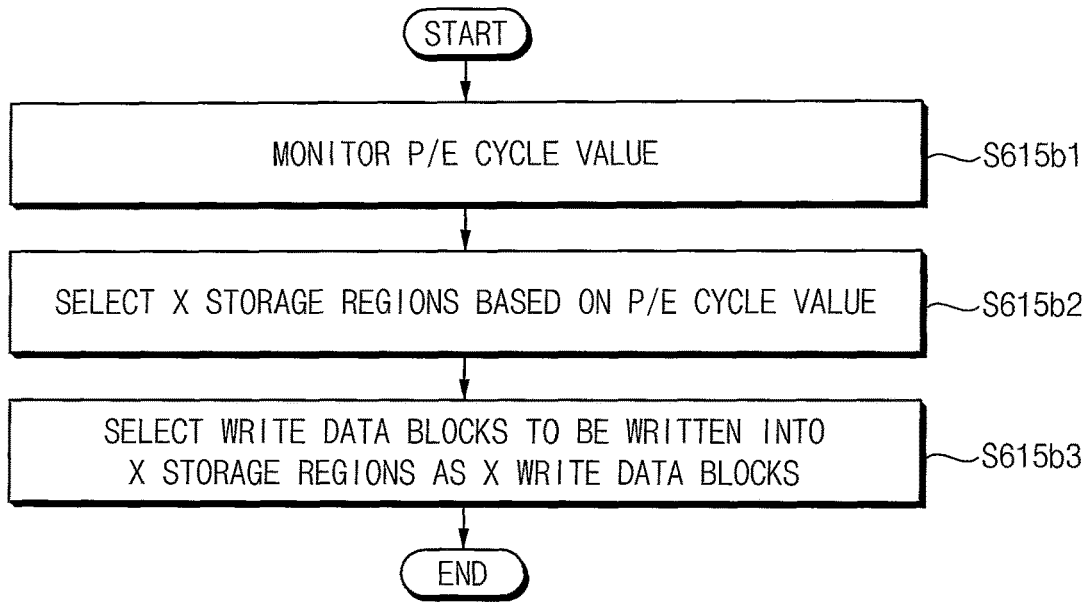
FIG. 16 is a flowchart illustrating an example of selecting X write data blocks in FIG. 9.
FIG. 17 is a diagram for describing an operation of FIG. 16 according to example embodiments.

FIG. 16 is a flowchart illustrating an example of selecting X write data blocks in FIG. 9. FIG. 17 is a diagram for describing an operation of FIG. 16.

Referring to FIGS. 9, 11A, 11B, 16 and 17, in operation S615, a program/erase (P/E) cycle value associated with each of the plurality of storage regions may be monitored (operation S615b1). For example, P/E cycle values PE_SR1, PE_SR2, PE_SR3, PESR4, PE_SR5 and PE_SR6 for the storage regions SR1 to SR6 may be monitored. The P/E cycle value may represent the number of times program and erase operations are performed on the storage region.

The X storage regions may be selected from among the plurality of storage regions based on the P/E cycle value (operation S615b2). Write data blocks to be written into the X storage regions from among the plurality of write data blocks may be selected as the X write data blocks (operation S615b3). For example, storage regions having relatively large P/E cycle values (e.g., heavily used storage regions) may be selected.

For example, the storage regions SR1 to SR6 may be sorted in descending order according to the P/E cycle values. In the example of FIG. 11A, the storage region SR3 having the largest P/E cycle value and the data block DB3 corresponding thereto may be selected. In the example of FIG. 11B, two storage regions SR3 and SR5 having large P/E cycle values and the data block DB3 and the parity block PB1 corresponding thereto may be selected.

Figures 18, 19:
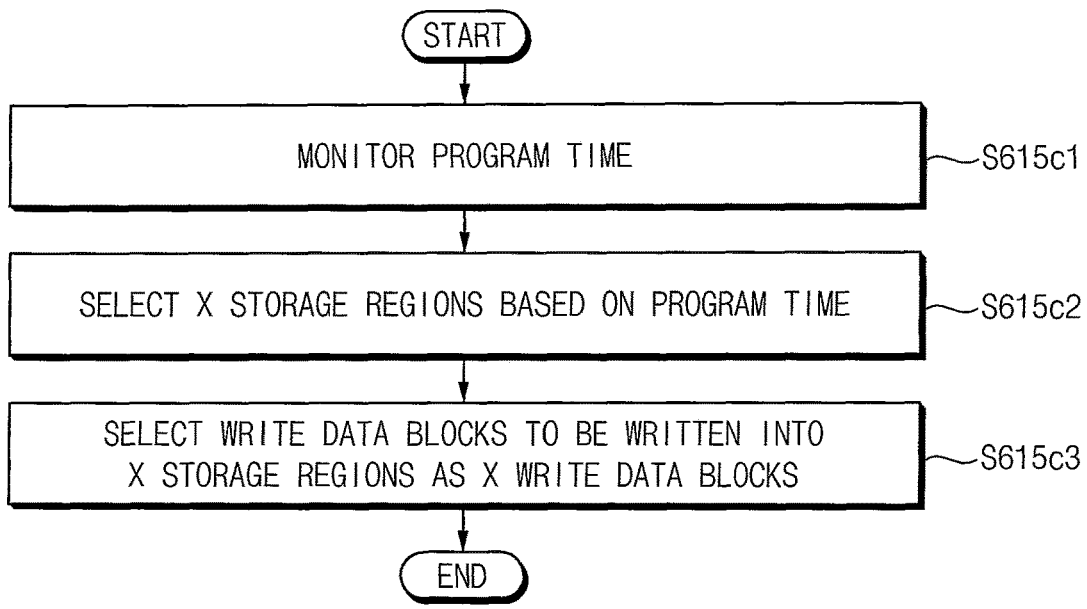
FIG. 18 is a flowchart illustrating an example of selecting X write data blocks in FIG. 9.
FIG. 19 is a diagram for describing an operation of FIG. 18 according to example embodiments.

FIG. 18 is a flowchart illustrating an example of selecting X write data blocks in FIG. 9. FIG. 19 is a diagram for describing an operation of FIG. 18.

Referring to FIGS. 9, 11A, 11B, 18 and 19, in operation S615, program time associated with each of the plurality of storage regions may be monitored (operation S615c1). For example, program times PT_SR1, PT_SR2, PT_SR3, PT_SR4, PT_SR5 and PT_SR6 for the storage regions SR1 to SR6 may be monitored. The program time may represent a time interval required to perform a program operation on the storage region.

The X storage regions on which the write operation is to be skipped may be selected from among the plurality of storage regions based on the program time (operation S615c2). Write data blocks to be written into the X storage regions from among the plurality of write data blocks may be selected as the X write data blocks (operation S615c3) to be blocked. For example, storage regions having relatively long program time (e.g., storage regions with slow program speed) may be selected.

For example, the storage regions SR1 to SR6 may be sorted in descending order according to the program time. In the example of FIG. 11A (when the number of write data blocks on which the write operation is to be skipped is one), the storage region SR3 having the longest program time and the data block DB3 corresponding thereto may be selected. In the example of FIG. 11B (when the number of write data blocks on which the write operation is to be skipped is two), two storage regions SR3 and SR5 having long program time and the data block DB3 and the parity block PB1 corresponding thereto may be selected.

Figure 20:
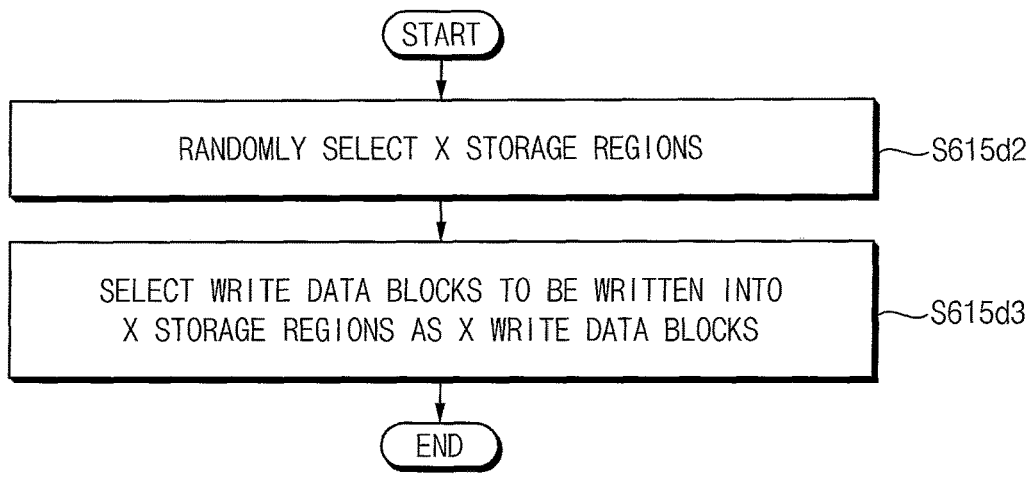
FIG. 20 is a flowchart illustrating an example of selecting X write data blocks in FIG. 9.

FIG. 20 is a flowchart illustrating an example of selecting X write data blocks in FIG. 9;

Referring to FIGS. 9 and 20, in operation S615, the X storage regions on which the write operation is to be skipped may be randomly selected from among the plurality of storage regions (operation S615d2). Write data blocks to be written into the X storage regions from among the plurality of write data blocks may be selected as the X write data blocks (operation S615d3).

Although the examples of criteria for selecting the X write data blocks are described with reference to FIGS. 14 through 20, example embodiments are not limited thereto, and the X write data blocks on which the write operation is to be skipped may be selected using various other criteria. In addition, although the examples where the X write data blocks are selected using one criterion are described, example embodiments are not limited thereto, and the X write data blocks on which the write operation is to be skipped may be selected using two or more criteria simultaneously (e.g., by simultaneously considering the storage region temperature and the P/E cycle value).

Figure 21:
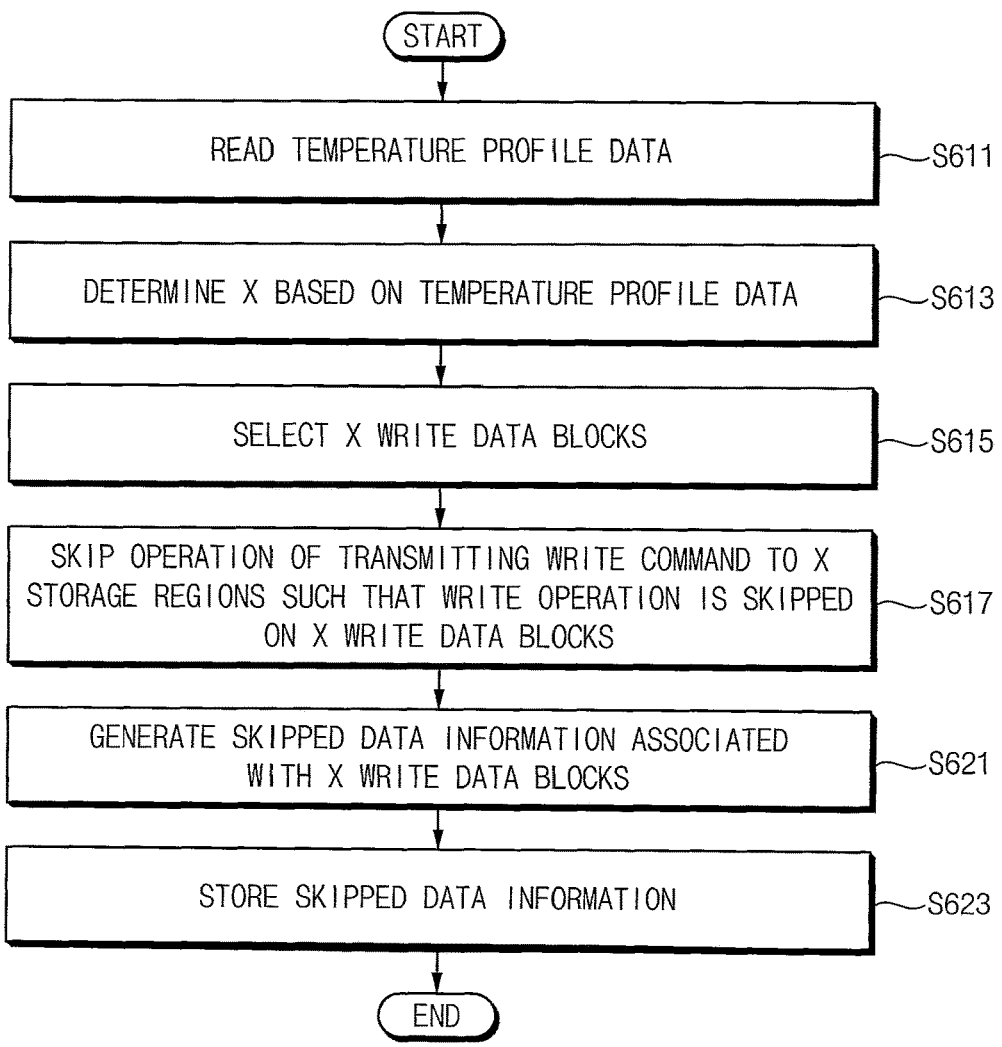
FIG. 21 is a flowchart illustrating an example of skipping a write operation on X write data blocks in FIG. 8.

FIG. 21 is a flowchart illustrating an example of skipping a write operation on X write data blocks in FIG. 8. The descriptions repeated with FIG. 9 will be omitted.

Referring to FIGS. 8 and 21, in operation S610, operations S611, S613, S615 and S617 may be substantially the same as those described with reference to FIG. 9.

Thereafter, skipped data information associated with the X write data blocks may be generated (operation S621), and the skipped data information may be stored (operation S623). For example, the skipped data information may include striping information, skipped block related information, and/or the like. Only the skipped data information associated with the X write data blocks may be stored, rather than directly storing the X write data blocks. For example, the skipped data information may identify the X write data blocks.

Operations S621 and S623 may be performed by the write module 480 in FIG. 4.

Figure 22:
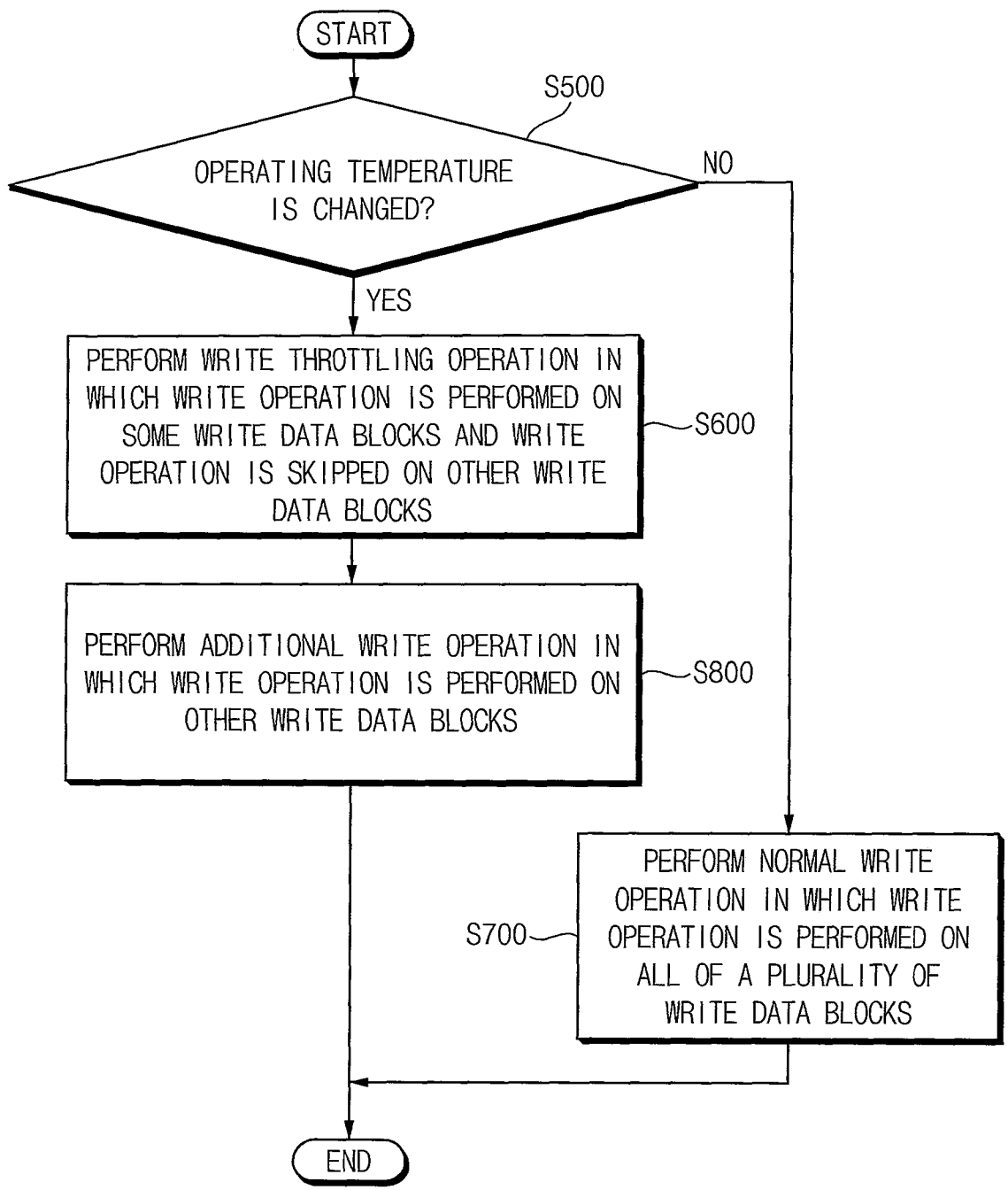
FIG. 22 is a flowchart illustrating an example of performing a write throttling operation or a normal write operation in FIG. 1.

FIG. 22 is a flowchart illustrating an example of performing a write throttling operation or a normal write operation in FIG. 1. The descriptions repeated with FIG. 2 will be omitted.

Referring to FIGS. 1 and 22, in operation S400, operations S500, S600 and S700 may be substantially the same as those described with reference to FIG. 2.

After the write throttling operation is performed, an additional write operation may be performed (operation S800). For example, the additional write operation may represent an operation in which a write operation is performed on other write data blocks on which the write operation is skipped from among the plurality of write data blocks. For example, the additional write operation may be performed when a predetermined condition is satisfied after performing the write throttling operation. For example, the predetermined condition may be that the storage device is in an idle state (as discussed below with respect to FIG. 26) or that the operating temperature is less than or equal to a second reference temperature TNORM (as discussed below with respect to FIG. 27).

In some example embodiments, after operation S600 is performed, the storage device may notify the host device that the write operation is not completed on the write data. For example, the above-described notification operation may be performed based on an asynchronous event request (AER). In this example, the storage device may perform operation S800 based on a request received from the outside (e.g., a request from the host device).

In other example embodiments, after operation S600 is performed, the storage device may notify the host device that the write operation is completed on the write data. In this example, the storage device may internally determine whether the predetermined condition is satisfied and may perform operation S800 based on the internal determination.

In some example embodiments, before operation S800 is performed, the storage device may notify the host device that operation S800 is to be performed. Thus, when a read request is received from the host device, the storage device may notify the host device that latency may occur for a read operation. In addition, when the host device receives a message or a signal representing that data cannot be read from the storage device, the host device may prepare to read the corresponding data from a backup server storing backup data (e.g., duplicated or copied data). For example, an operation of reading the backup data may be performed using a network protocol such as a nonvolatile memory express (NVMe) over Fabrics (NVMe-oF).

Figure 23:
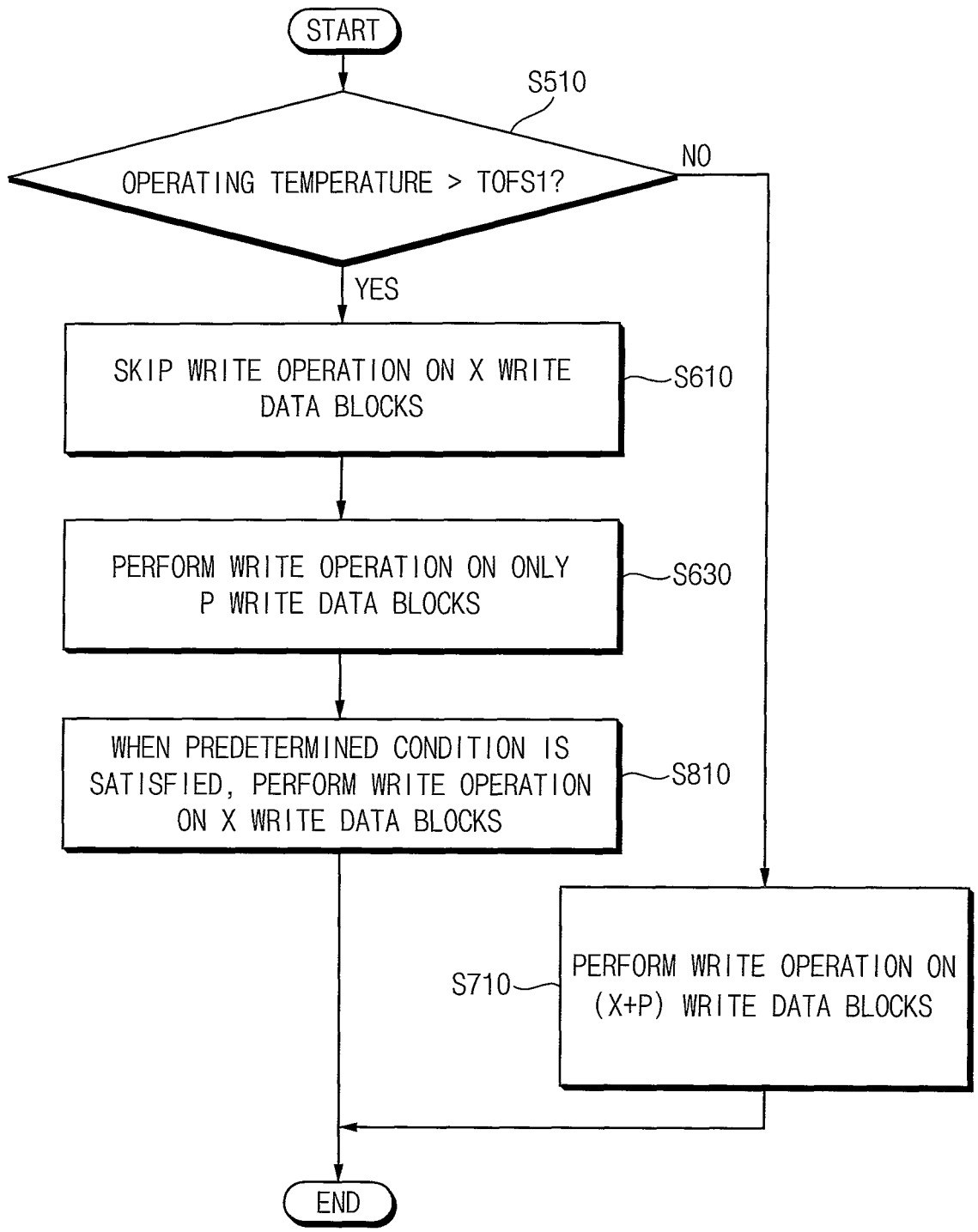
FIG. 23 is a flowchart illustrating an example of performing a write throttling operation or a normal write operation of FIG. 22.

FIG. 23 is a flowchart illustrating an example of performing a write throttling operation or a normal write operation of FIG. 22. The descriptions repeated with FIG. 8 will be omitted.

Referring to FIGS. 22 and 23, operations S510, S610, S630 and S710 may be substantially the same as those described with reference to FIG. 8.

In operation S800, when the predetermined condition is satisfied, a write operation may be performed on the X write data blocks on which the write operation is skipped in operation S610 (operation S810).

Figure 24:
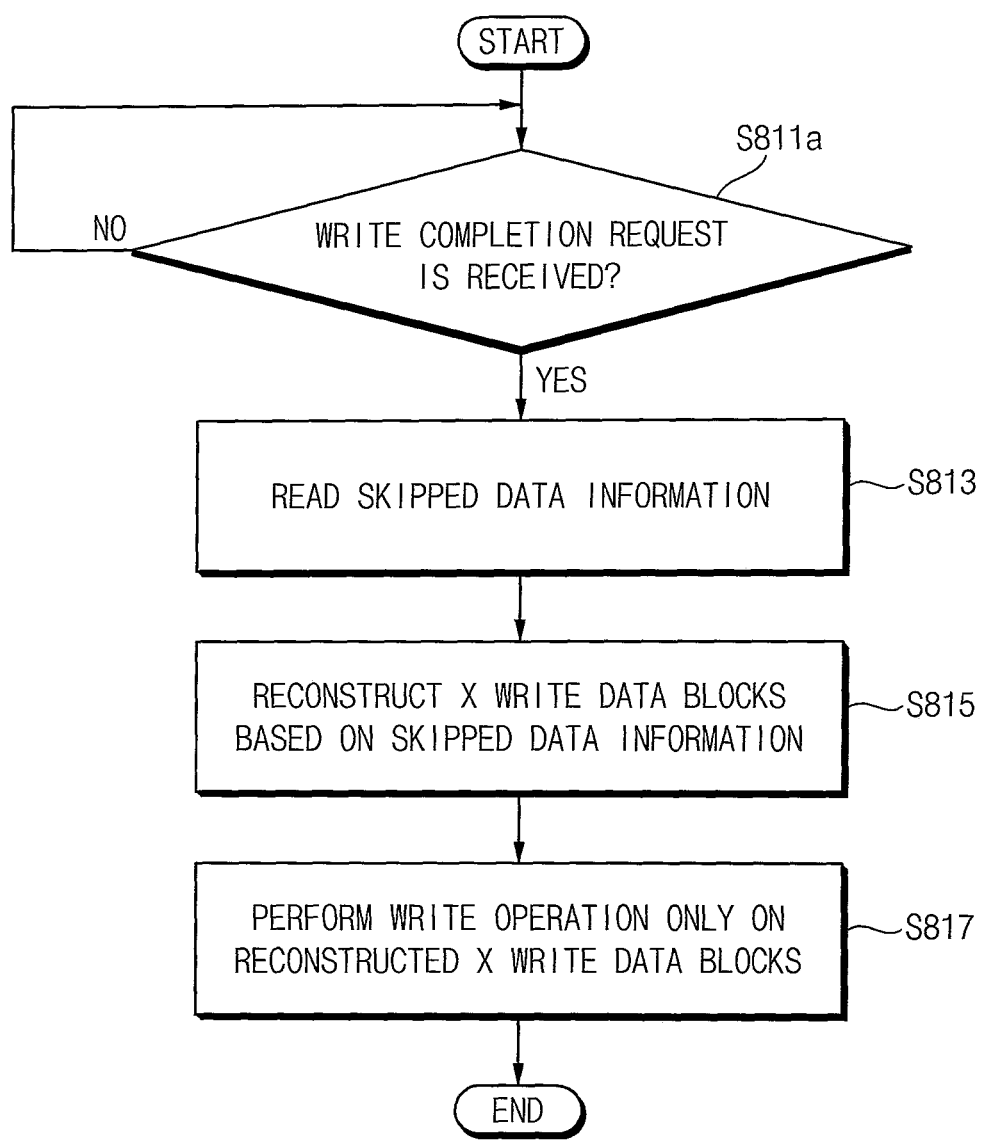
FIG. 24 is a flowchart illustrating an example of performing a write operation on X write data blocks in FIG. 23.

FIG. 24 is a flowchart illustrating an example of performing a write operation on X write data blocks in FIG. 23.

Referring to FIGS. 23 and 24, in operation S810, when a write completion request is received from the host device (operation S811a: YES), the skipped data information that is generated and stored while the write operation is skipped on the X write data blocks may be read (operation S813). For example, the skipped data information may be generated and stored by operations S621 and S623 in FIG. 21, and may be stored in the write module 480 in FIG. 4.

The X write data blocks may be reconstructed based on the skipped data information (operation S815). A write command may be transmitted to X storage regions among the plurality of storage regions such that the write operation is performed only on the reconstructed X write data blocks (operation S817). The X storage regions may correspond to the X write data blocks.

Operation S815 may be performed by the data reconstruction module 444 in FIG. 4, and operation S817 may be performed by the write module 480 in FIG. 4.

When the write completion request is not received (operation S811a: NO), the storage device may wait to receive the write completion request.

Figure 25A:
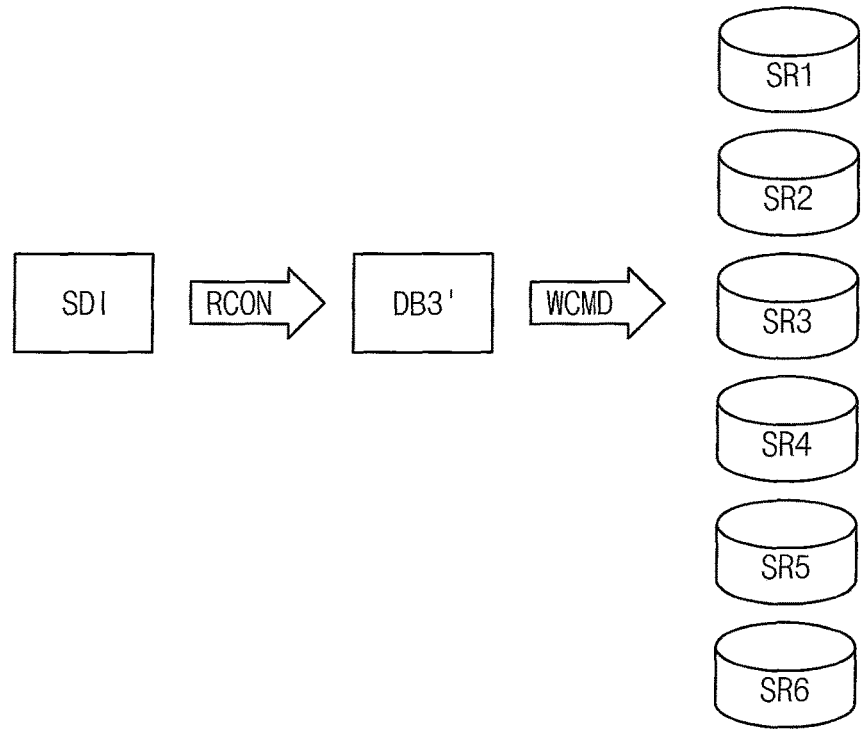
FIGS. 25A and 25B are diagrams for describing an operation of FIG. 24 according to example embodiments.
Figure 25B:
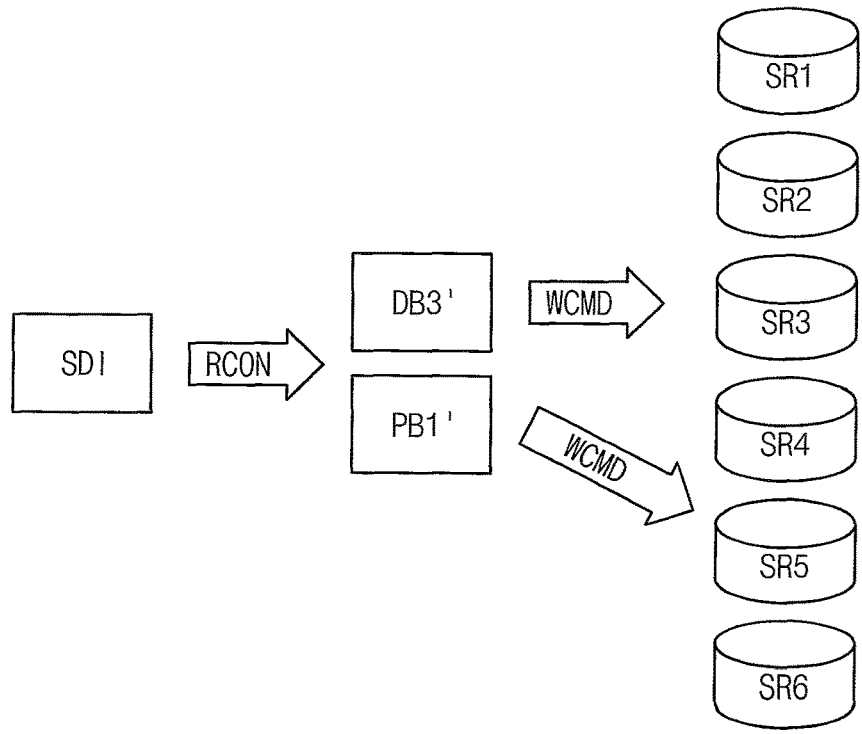

FIGS. 25A and 25B are diagrams for describing an operation of FIG. 24.

Referring to FIG. 25A, an example of the operation of FIG. 24 after the write operation is skipped on the data block DB3 as in FIG. 11A is illustrated.

For example, when the write completion request is received, data block DB3' may be generated or reconstructed by performing a data reconstruction operation RCON based on the skipped data information SDI. The reconstructed data block DB3' may be substantially the same as the data block DB3 in FIG. 11A. Thereafter, the write command WCMD may be transmitted to the storage region SR3, and the reconstructed data block DB3' may be written into the storage region SR3.

Referring to FIG. 25B, an example of the operation of FIG. 24 after the write operation is skipped on the data block DB3 and the parity block PB1 as in FIG. 11B is illustrated.

For example, when the write completion request is received, data block DB3' and parity block PB1' may be generated or reconstructed by performing a data reconstruction operation RCON based on the skipped data information SDI. The reconstructed data block DB3' and the reconstructed parity block PB1' may be substantially the same as the data block DB3 and the parity block PB1 in FIG. 11B, respectively. Thereafter, the write command WCMD may be transmitted to the storage regions SR3 and SR5, and the reconstructed data block DB3' and the reconstructed parity block PB1' may be written into the storage regions SR3 and SR5.

Figure 26:
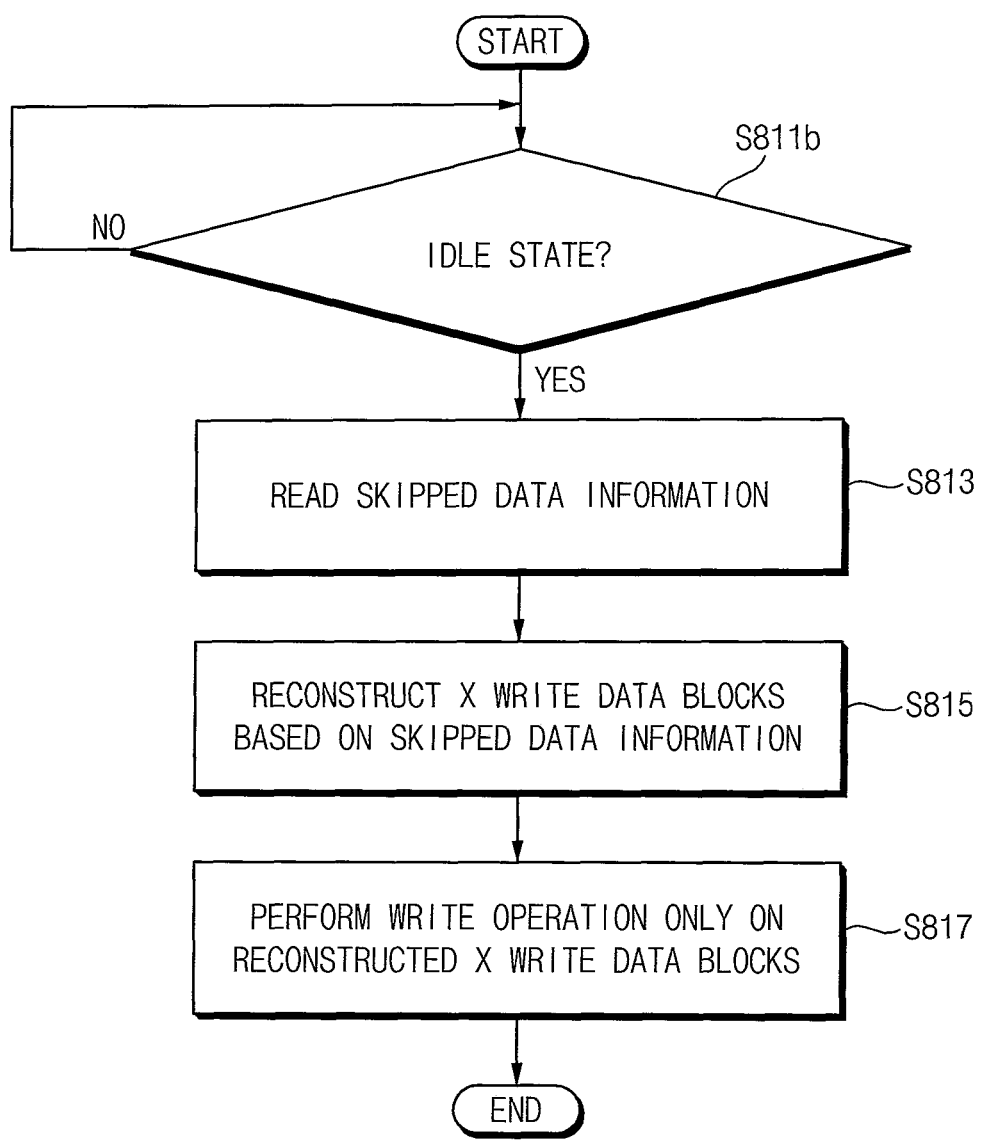
FIGS. 26 and 27 are flowcharts illustrating examples of performing a write operation on X write data blocks in FIG. 23.
Figure 27:
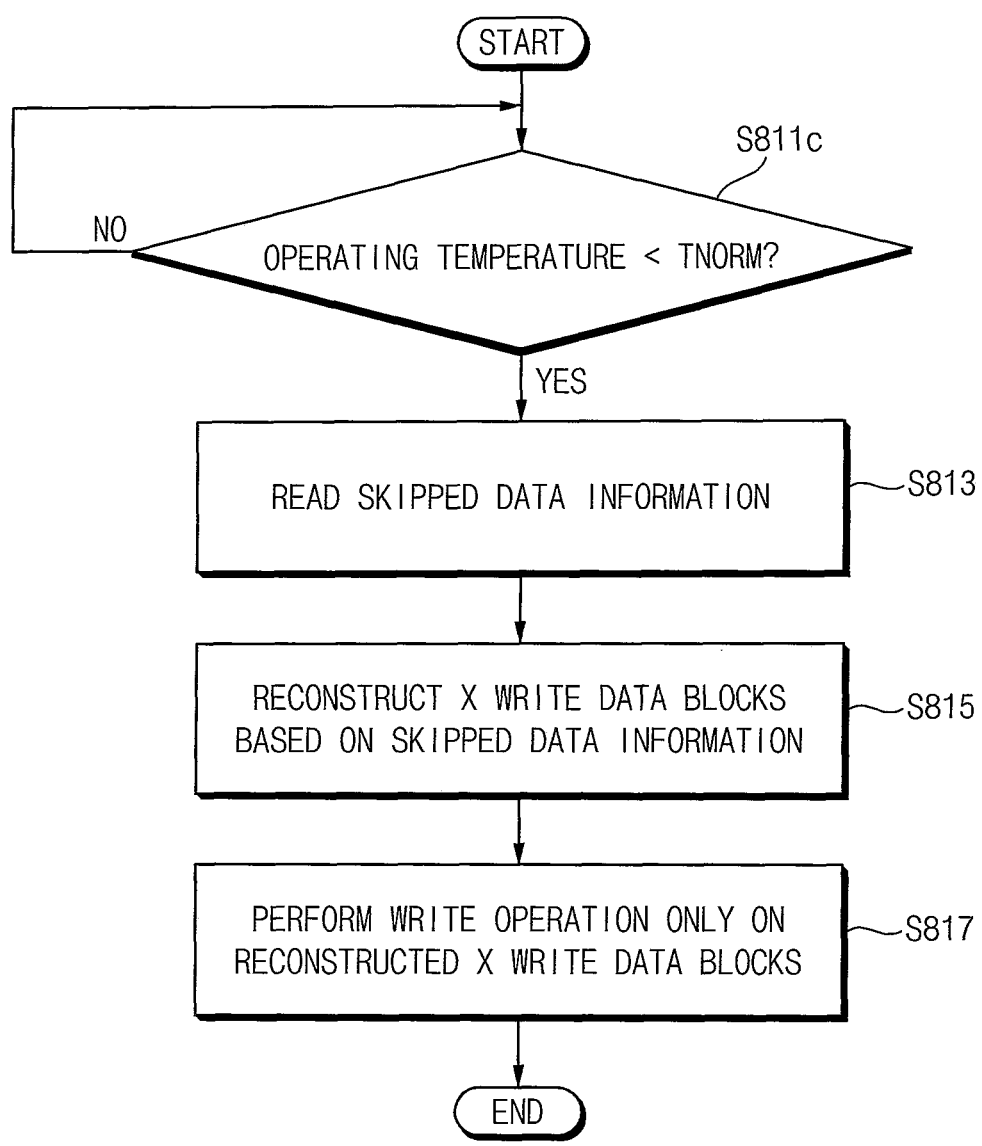

FIGS. 26 and 27 are flowcharts illustrating examples of performing a write operation on X write data blocks in FIG. 23. The descriptions repeated with FIG. 24 will be omitted.

Referring to FIGS. 23 and 26, in operation S810, when the storage device is in an idle state (or idle time) (operation S811b: YES), operations S813, S815 and S817 may be performed. In this regard, as noted above, the predetermined condition may be that the storage device is in an idle state. Operations S813, S815 and S817 may be substantially the same as those described with reference to FIG. 24.

When the storage device is not in the idle state (operation S811b: NO), the storage device may wait to enter the idle state.

Referring to FIGS. 23 and 27, in operation S810, when the operating temperature becomes lower than a second reference temperature TNORM lower than the first reference temperature (operation S811c: YES), operations S813, S815 and S817 may be performed. In this regard, as noted above, the predetermined condition may be that the operating temperature becomes lower than the second reference temperature TNORM. Operations S813, S815 and S817 may be substantially the same as those described with reference to FIG. 24. The second reference temperature TNORM may be referred to as normal temperature, or the like.

When the operating temperature is higher than or equal to the second reference temperature TNORM (operation S811c: NO), the storage device may wait to decrease the operating temperature.

Although the examples of conditions for performing the additional write operation are described with reference to FIGS. 24 through 27, example embodiments are not limited thereto, and the additional write operation may be performed based on various other conditions. In addition, although the examples where the additional write operation is performed based on one condition are described, example embodiments are not limited thereto, and the additional write operation may be performed when two or more conditions are simultaneously satisfied.

In some example embodiments, if it is difficult to reconstruct the write data blocks on which the write operation is skipped, the reconstruction operation may be performed based on the backup data when the write data is copied or duplicated and the copied data is stored as the backup data.

Figure 28:
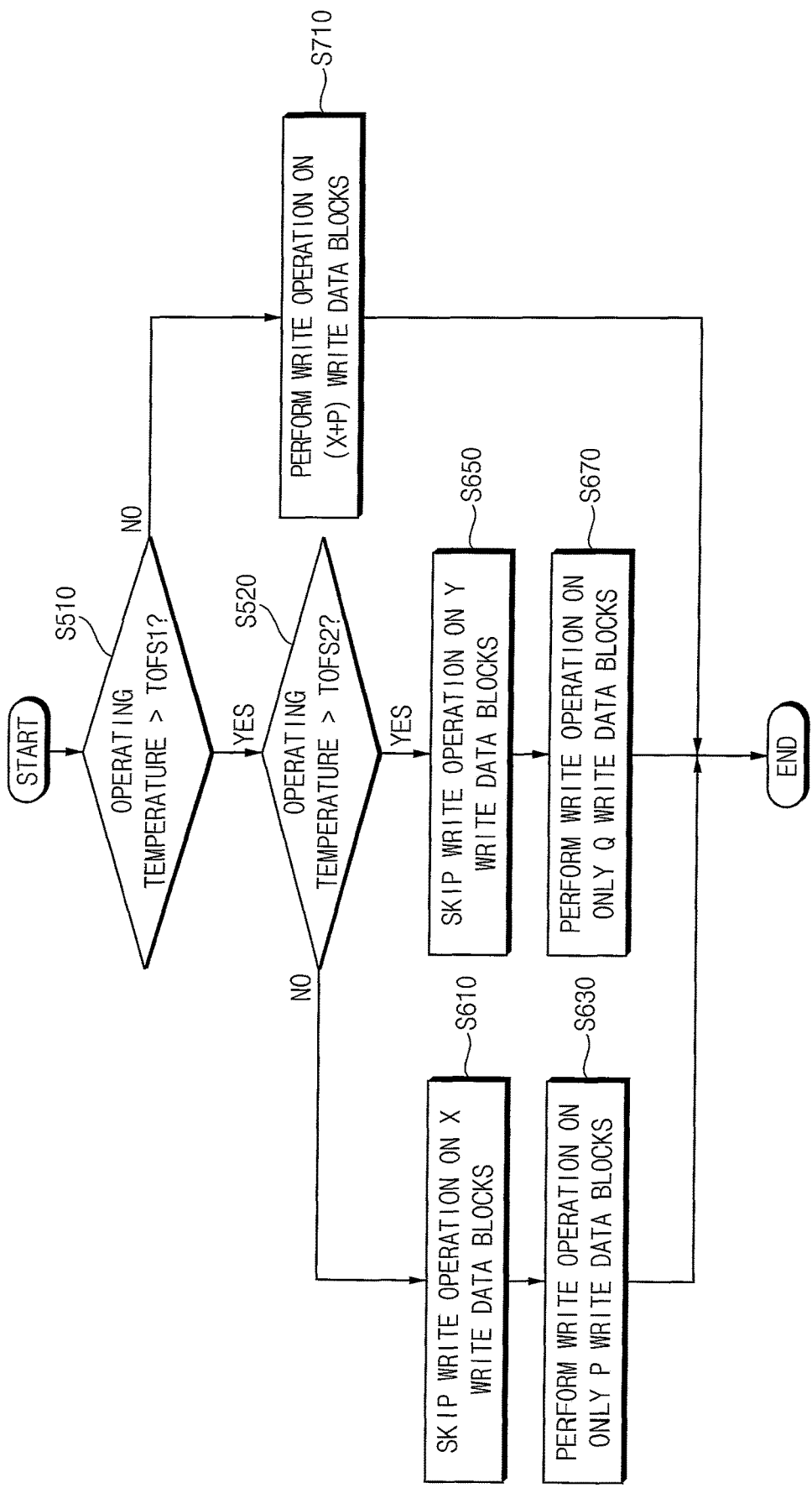
FIG. 28 is a flowchart illustrating an example of performing a write throttling operation or a normal write operation of FIG. 2.

FIG. 28 is a flowchart illustrating an example of performing a write throttling operation or a normal write operation of FIG. 2. The descriptions repeated with FIG. 8 will be omitted.

Referring to FIGS. 2 and 28, operations S510, S610, S630 and S710 may be substantially the same as those described with reference to FIG. 8. When the operating temperature becomes higher than the first reference temperature TOFS1 (operation S510: YES), and when the operating temperature is lower than or equal to a third reference temperature TOFS2 higher than the first reference temperature TOFS1 (operation S520: NO), operations S610 and S630 may be performed.

When the operating temperature becomes higher than the third reference temperature TOFS2 (operation S520: YES), a write operation may be skipped on Y write data blocks among the plurality of write data blocks, where Y is a natural number greater than X (operation S650), and a write operation may be performed only on Q write data blocks among the plurality of write data blocks, where Q is a natural number less than P (operation S670). Operations S650 and S670 may be substantially same as operations S610 and S630, respectively, except that X and P are changed to Y and Q, respectively. For example, operations S610 and S630 may correspond to FIG. 11A, and operations S650 and S670 may correspond to FIG. 11B. In other words, as the operating temperature increases, the number of write data blocks on which the write operation is skipped may increase.

Figure 29:
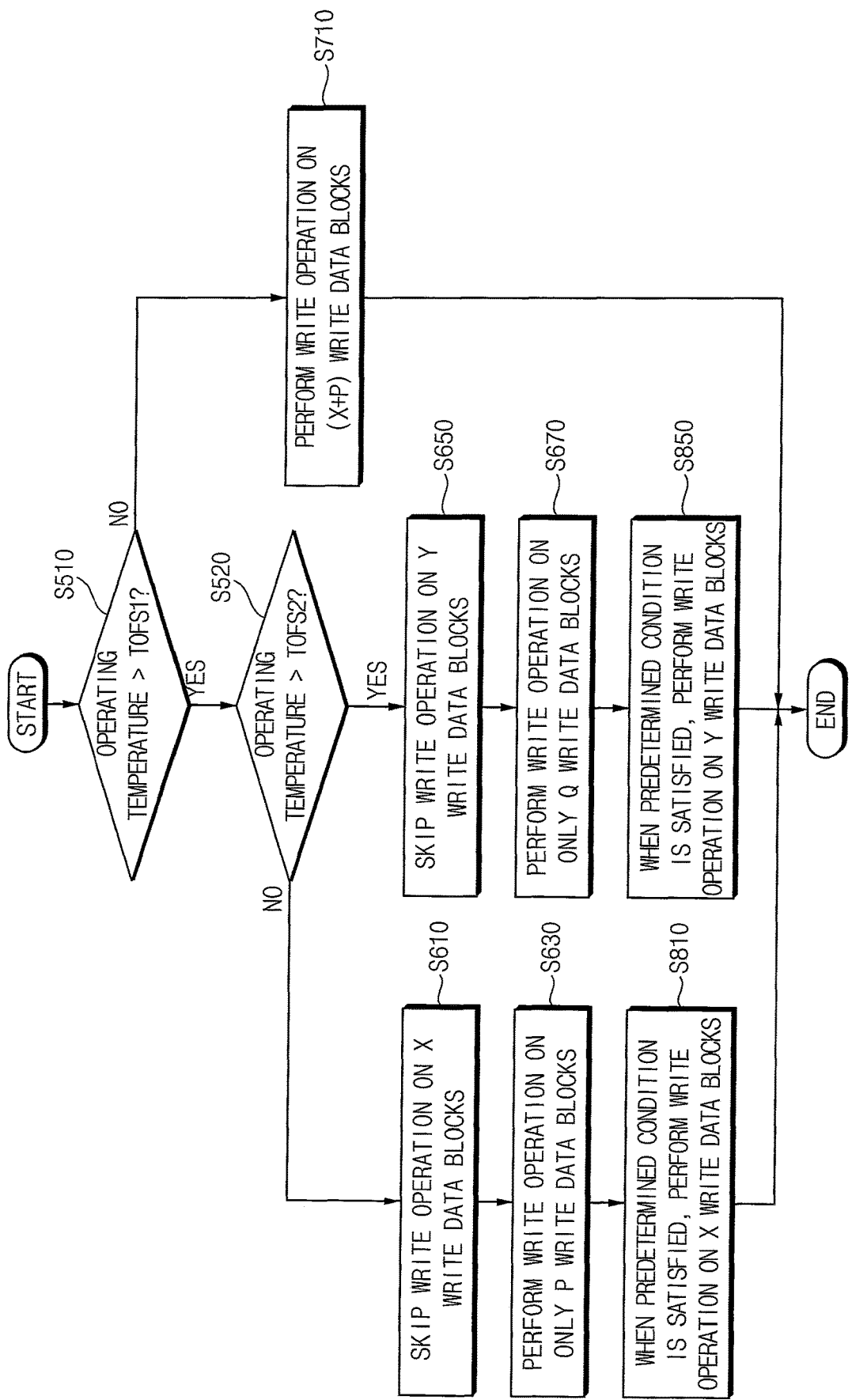
FIG. 29 is a flowchart illustrating an example of performing a write throttling operation or a normal write operation of FIG. 22.

FIG. 29 is a flowchart illustrating an example of performing a write throttling operation or a normal write operation of FIG. 22. The descriptions repeated with FIGS. 8 and 23 will be omitted.

Referring to FIGS. 22 and 29, operations S510, S610, S630, S810 and S710 may be substantially the same as those described with reference to FIG. 23, and operations S520, S650 and S670 may be substantially the same as those described with reference to FIG. 28.

In operation S800, when the predetermined condition is satisfied, a write operation may be performed on the Y write data blocks on which the write operation is skipped in operation S650 (operation S850). Operation S850 may be substantially the same as operation S810, except that X is changed to Y.

Although the write throttling operation is described with reference to FIGS. 8 through 29 based on the examples where the number of reference temperatures is one or two, example embodiments are not limited thereto, and the write throttling operation may be performed based on an example where the number of reference temperatures is three or more.

Figure 30:
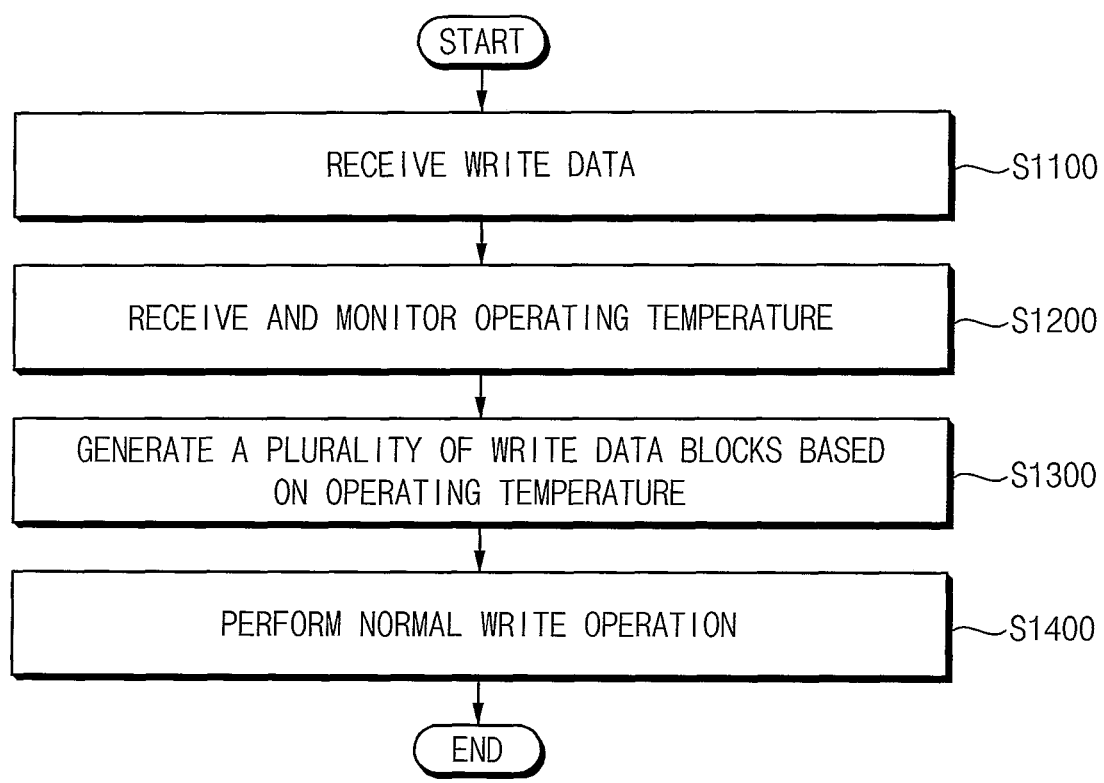
FIG. 30 is a flowchart illustrating a method of writing data in a storage device according to example embodiments.

FIG. 30 is a flowchart illustrating a method of writing data in a storage device according to example embodiments.

Referring to FIG. 30, in a method of writing data in a storage device according to example embodiments, operations S1100 and S1200 may be substantially the same as operations S100 and S200 in FIG. 1, respectively.

A plurality of write data blocks may be generated based on the write data and the operating temperature (operation S1300). Operation S1300 may be similar to operation S300 in FIG. 1. In addition, in operation S1300, an operation of generating the write data blocks may be changed based on a change in the operating temperature, e.g., the number (or quantity) of generated write data blocks may be changed based on the change in the operating temperature. Operation S1300 will be described with reference to FIG. 31.

A normal write operation in which a write operation is performed on all of the plurality of write data blocks may be performed (operation S1400). The normal write operation may be performed by transmitting a write command to all of the plurality of storage regions. For example, operation S1400 may be performed as described with reference to FIGS. 12 and 13.

Figure 31:
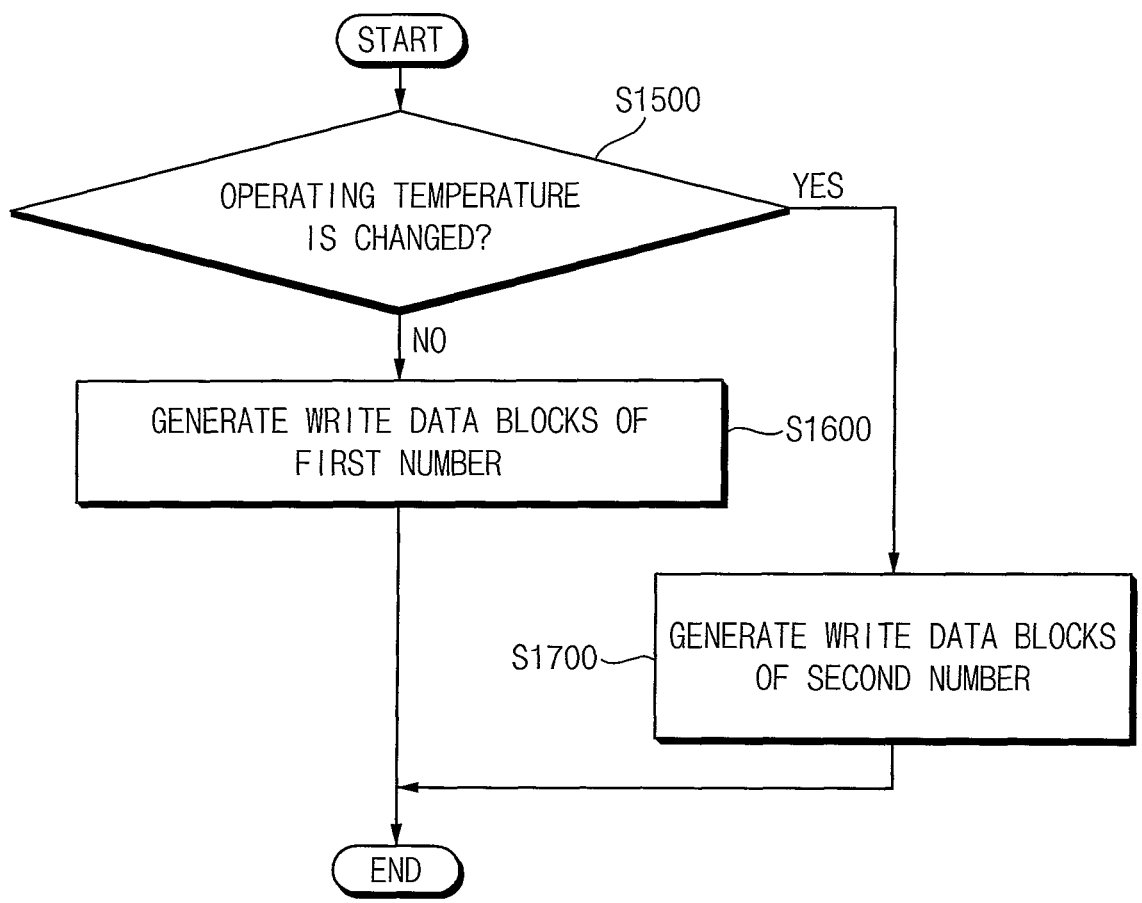
FIG. 31 is a flowchart illustrating an example of generating a plurality of write data blocks in FIG. 30.

FIG. 31 is a flowchart illustrating an example of generating a plurality of write data blocks in FIG. 30.

Referring to FIGS. 30 and 31, in operation S1300, when it is determined that the operating temperature is changed (operation S1500: YES), write data blocks of a first number (or quantity) may be generated based on the write data (operation S1600). When it is determined that the operating temperature is not changed and is maintained (operation S1500: NO), write data blocks of a second number (or quantity) may be generated based on the write data (operation S1700). The second number may be different from the first number.

Figure 32:
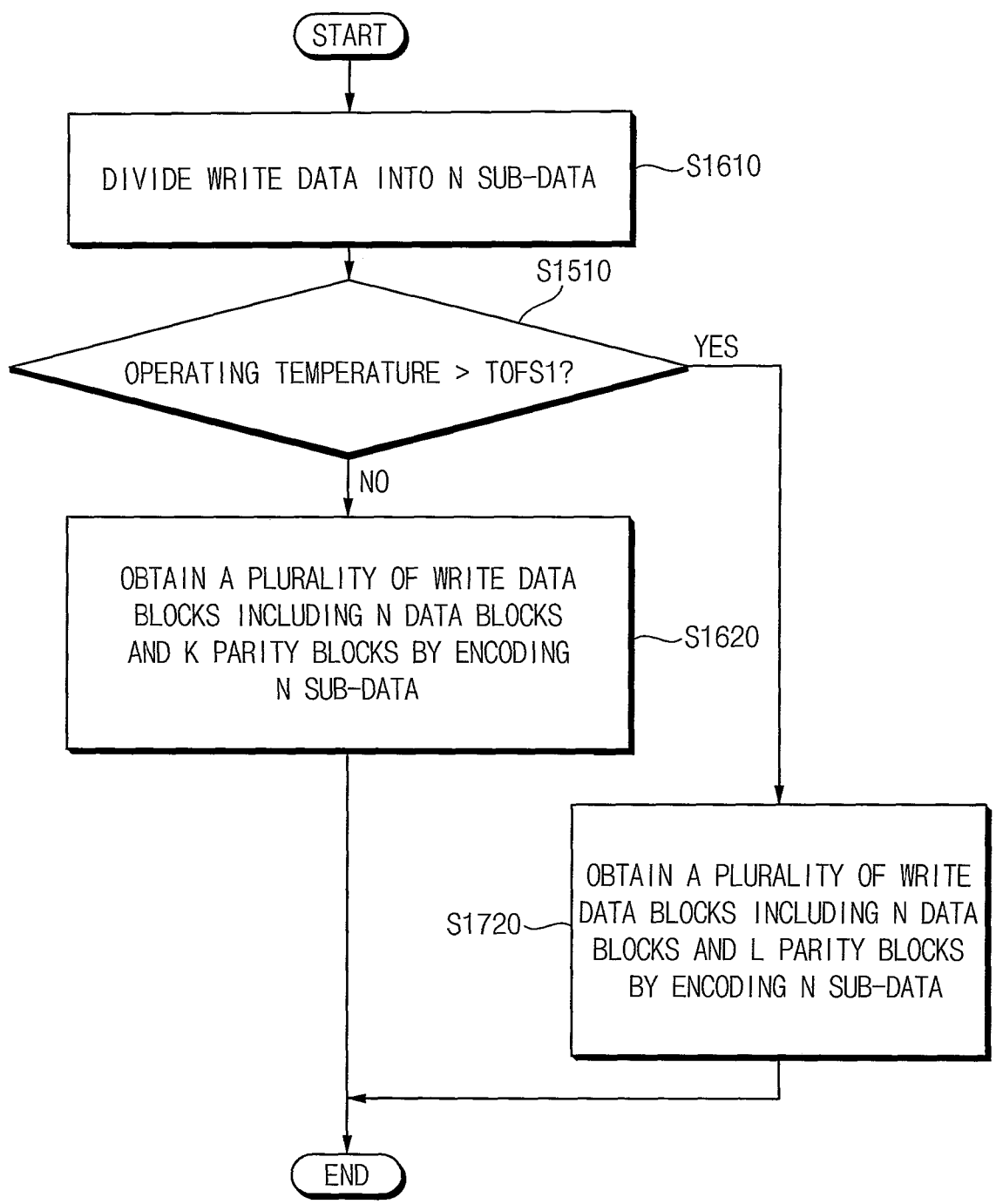
FIG. 32 is a flowchart illustrating an example of generating a plurality of write data blocks in FIG. 31.

FIG. 32 is a flowchart illustrating an example of generating a plurality of write data blocks in FIG. 31.

Referring to FIGS. 31 and 32, operation S1510 may be substantially the same as operation S510 in FIG. 8, and operations S1610 and S1620 may be substantially the same as operations S310 and S330 in FIG. 6, respectively. When the operating temperature is lower than or equal to the first reference temperature TOFS1 (operation S1510: NO), operation S1620 may be performed.

When the operating temperature becomes higher than the first reference temperature TOFS1 (operation S1510: YES), the plurality of write data blocks that include N data blocks and L parity blocks may be obtained by encoding the N sub-data, where L is a natural number greater than K (operation S1720). In other words, as the operating temperature increases, the number of generated parity blocks increases, and thus the data recovery rate may increase.

Figure 33:
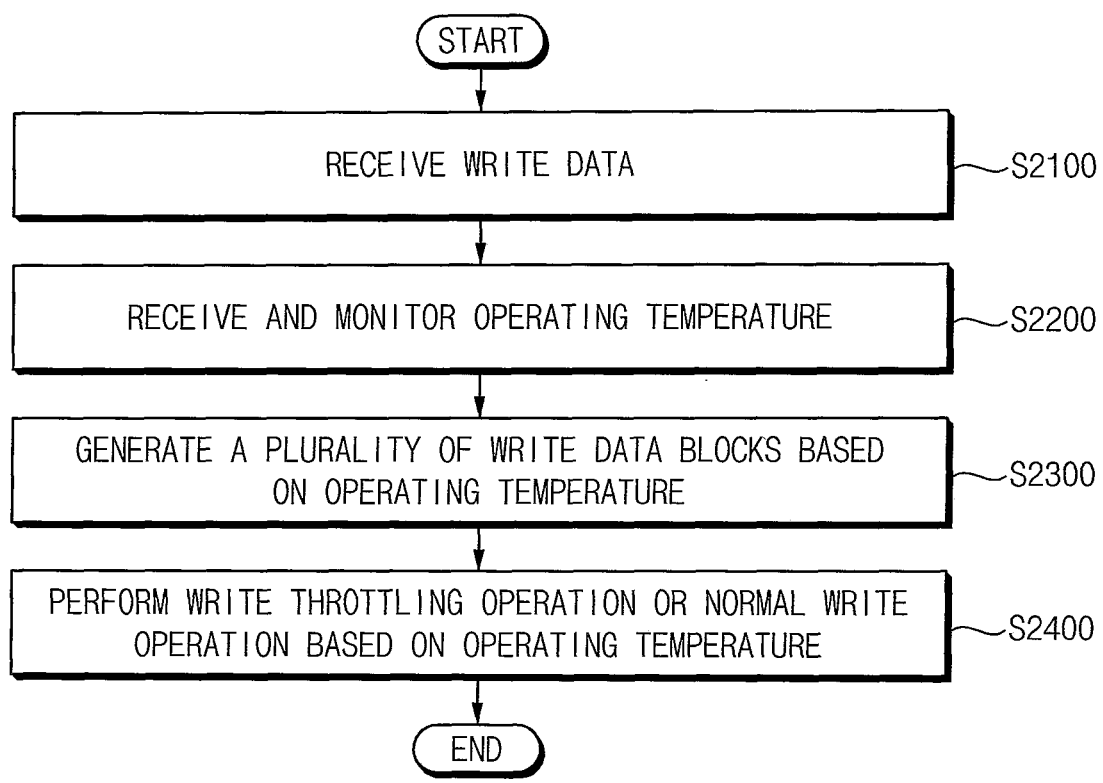
FIG. 33 is a flowchart illustrating a method of writing data in a storage device according to example embodiments.

FIG. 33 is a flowchart illustrating a method of writing data in a storage device according to example embodiments.

Referring to FIG. 33, in a method of writing data in a storage device according to example embodiments, operations S2100, S2200 and S2400 may be substantially the same as operations S100, S200 and S400 in FIG. 1, respectively, and operation S2300 may be substantially the same as operation S2300 in FIG. 30. The example of FIG. 33 may be obtained by combining the example of FIG. 1 and the example of FIG. 30.

Figure 34:
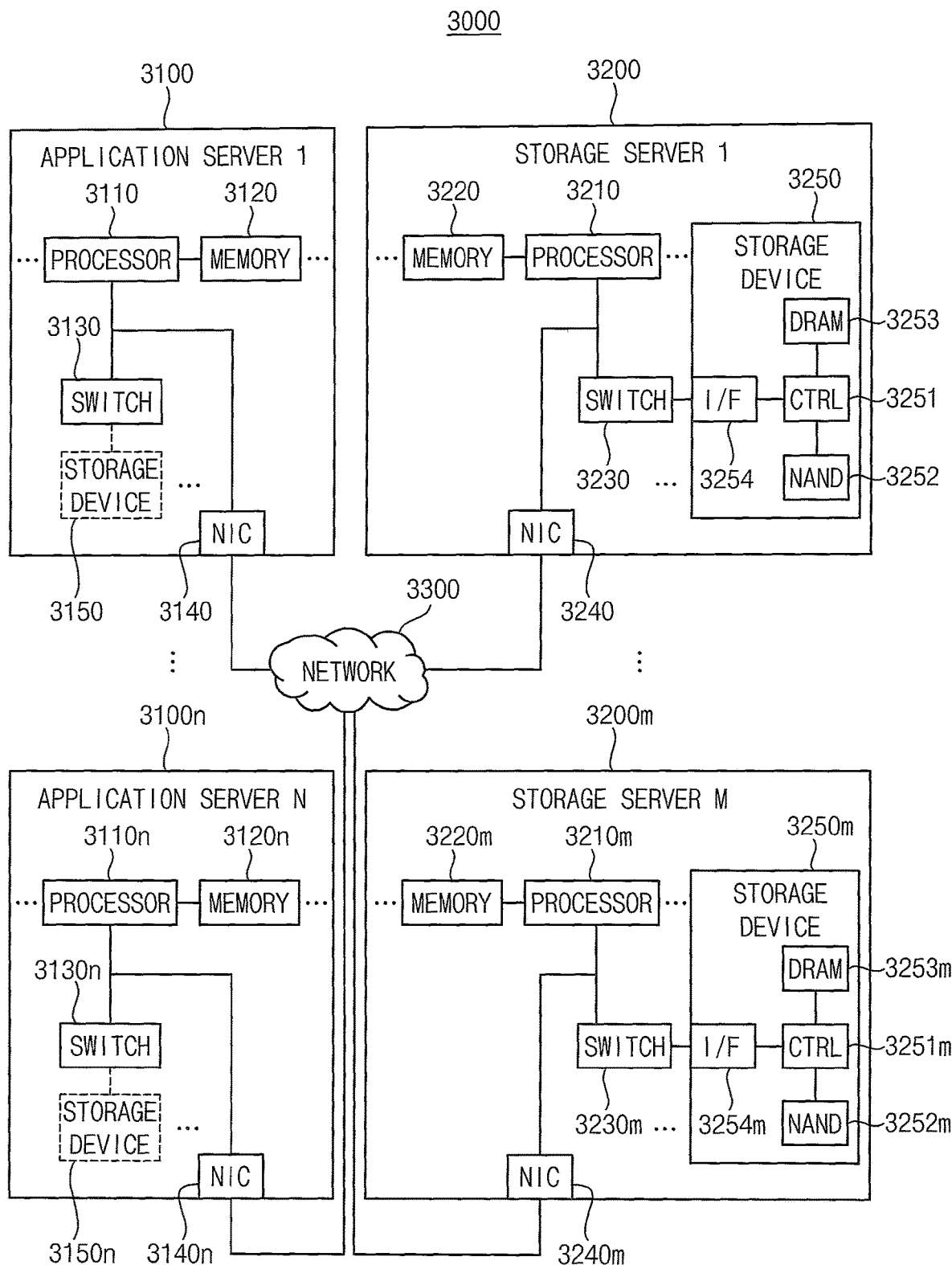
FIG. 34 is a block diagram illustrating a data center including a storage device according to example embodiments.

FIG. 34 is a block diagram illustrating a data center including a storage device according to example embodiments.

Referring to FIG. 34, a data center 3000 may be a facility that collects various types of data and provides various services, and may be referred to as a data storage center. The data center 3000 may be a system for operating search engines and databases, and may be a computing system used by companies such as banks or government agencies. The data center 3000 may include application servers 3100 to 3100n and storage servers 3200 to 3200m. The number of the application servers 3100 to 3100n and the number of the storage servers 3200 to 3200m may be variously selected according to example embodiments, and the number of the application servers 3100 to 3100n and the number of the storage servers 3200 to 3200m may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 3210 and the number of the memories 3220 included in the storage server 3200 may be variously selected according to example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 included in the storage server 3200 may be variously selected according to example embodiments.

The application servers 3100 to 3100n and the storage servers 3200 to 3200m may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200m may be provided as file storages, block storages or object storages according to an access scheme of the network 3300.

In some example embodiments, the network 3300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other example embodiments, the network 3300 may be a general network such as the TCP/IP network. For example, the network 3300 may be implemented according to at least one of protocols such as an FC over Ethernet (FCoE), a network attached storage (NAS), a nonvolatile memory express (NVMe) over Fabrics (NVMe-oF), etc.

Hereinafter, example embodiments will be described based on the application server 3100 and the storage server 3200. The description of the application server 3100 may be applied to the other application server 3100n, and the description of the storage server 3200 may be applied to the other storage server 3200m.

The application server 3100 may store data requested to be stored by a user or a client into one of the storage servers 3200 to 3200m through the network 3300. In addition, the application server 3100 may obtain data requested to be read by the user or the client from one of the storage servers 3200 to 3200m through the network 3300. For example, the application server 3100 may be implemented as a web server or a database management system (DBMS).

The application server 3100 may access a memory 3120n or a storage device 3150n included in the other application server 3100n through the network 3300, and/or may access the memories 3220 to 3220m or the storage devices 3250 to 3250m included in the storage servers 3200 to 3200m through the network 3300. Thus, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. The data may be transferred from the storage devices 3250 to 3250m of the storage servers 3200 to 3200m to the memories 3120 to 3120n of the application servers 3100 to 3100n directly or through the memories 3220 to 3220m of the storage servers 3200 to 3200m. For example, the data transferred through the network 3300 may be encrypted data for security or privacy.

In the storage server 3200, an interface 3254 may provide a physical connection between the processor 3210 and a controller 3251 and/or a physical connection between a network interface card (MC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, a compute express link (CXL), an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under a control of the processor 3210. Similarly, the application server 3100 may further include a switch 3130 and an NIC 3140.

In some example embodiments, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230 and the storage device 3250.

In the storage servers 3200 to 3200m and/or the application servers 3100 to 3100n, the processor may transmit a command to the storage devices 3150 to 3150n and 3250 to 3250m or the memories 3120 to 3120n and 3220 to 3220m to program or read data. For example, the data may be error-corrected data by an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 3150 to 3150m and 3250 to 3250m may transmit a control signal and command/address signals to NAND flash memory devices 3252 to 3252m in response to a read command received from the processor. When data is read from the NAND flash memory devices 3252 to 3252m, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control overall operations of the storage device 3250. In some example embodiments, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210m in the other storage server 3200m, or the processors 3110 to 3110n in the application servers 3100 to 3100n. A DRAM 3253 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252.

Each of the storage devices 3250 to 3250m may be the storage device according to example embodiments, and may perform the method of writing data in the storage device according to example embodiments.

The inventive concept may be applied to various electronic devices and systems that include the storage devices. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

In some embodiments, each of the components represented by a block as illustrated in FIGS. 3-5, and 34 may be implemented as various numbers of hardware, software and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A method of writing data in a storage device, the method comprising:
receiving write data from a host device;
monitoring an operating temperature of the storage device;
generating a plurality of write data blocks respectively corresponding to a plurality of storage regions of the storage device based on the write data; and
based on the operating temperature, performing a write throttling operation comprising performing a write operation on P write data blocks among the plurality of write data blocks by transmitting a write command to P storage regions among the plurality of storage regions and skipping the write operation on X write data blocks among the plurality of write data blocks by skipping an operation of transmitting the write command to X storage regions among the plurality of storage regions, wherein P and X are natural numbers.

2. The method of claim 1, wherein the write throttling operation is performed based on the operating temperature being higher than a first reference temperature, and
wherein skipping the write operation on the X write data blocks comprises:
reading temperature profile data for the operating temperature;
determining X based on the temperature profile data;
selecting the X write data blocks from among the plurality of write data blocks; and
skipping the operation of transmitting the write command to the X storage regions, the X storage regions corresponding to the X write data blocks.

3. The method of claim 2, wherein selecting the X write data blocks comprises:
monitoring a storage region temperature associated with each of the plurality of storage regions;
selecting the X storage regions from among the plurality of storage regions based on the storage region temperature; and
selecting the X write data blocks based on the X storage regions.

4. The method of claim 2, wherein selecting the X write data blocks comprises:
monitoring a program/erase (P/E) cycle value associated with each of the plurality of storage regions;
selecting the X storage regions from among the plurality of storage regions based on the P/E cycle value; and
selecting the X write data blocks based on the X storage regions.

5. The method of claim 2, wherein selecting the X write data blocks comprises:
monitoring a program time associated with each of the plurality of storage regions;
selecting the X storage regions from among the plurality of storage regions based on the program time; and
selecting the X write data blocks based on the X storage regions.

6. The method of claim 2, wherein selecting the X write data blocks comprises:
randomly selecting the X storage regions from among the plurality of storage regions; and
selecting the X write data blocks based on the X storage regions.

7. The method of claim 2, further comprising determining X based on the temperature profile data.

8. The method of claim 2, wherein the skipping the write operation on the X write data blocks further comprises:
generating skipped data information associated with the X write data blocks; and
storing the skipped data information.

9. The method of claim 2, wherein the write operation on the P write data blocks comprises transmitting the write command to the P storage regions such that the write operation is performed on the P write data blocks, the P storage regions corresponding to the P write data blocks.

10. The method of claim 1, wherein the write throttling operation is performed based on the operating temperature being higher than a first reference temperature, and
wherein the method further comprises, after performing the write throttling operation, performing an additional write operation in which the write operation is performed on the X write data blocks.

11. The method of claim 10, wherein the additional write operation comprises:
based on a write completion request from the host device, reading skipped data information that is generated and stored while the write operation is skipped on the X write data blocks;
reconstructing the X write data blocks based on the skipped data information; and
performing the write operation only on the reconstructed X write data blocks.

12. The method of claim 10, wherein the additional write operation comprises:
 based on the storage device being in an idle state, reading skipped data information that is generated and stored while the write operation is skipped on the X write data blocks;
 reconstructing the X write data blocks based on the skipped data information; and
 performing a write operation only on the reconstructed X write data blocks.

13. The method of claim 10, wherein the additional write operation comprises:
 based on the operating temperature becoming lower than a second reference temperature lower than the first reference temperature, reading skipped data information that is generated and stored while the write operation is skipped on the X write data blocks;
 reconstructing the X write data blocks based on the skipped data information; and
 performing a write operation only on the reconstructed X write data blocks.

14. The method of claim 1, wherein the write throttling operation is performed based on the operating temperature being higher than a first reference temperature, and
 wherein the write throttling operation further comprises, based on the operating temperature being higher than a third reference temperature higher than the first reference temperature, increasing X and decreasing P.

15. The method of claim 1, further comprising based on the operating temperature dropping below a first reference temperature, performing a normal write operation in which the write operation is performed on each of the plurality of write data blocks by transmitting the write command to each of the plurality of storage regions.

16. The method of claim 1, wherein the generating the plurality of write data blocks comprises:
 dividing the write data into N sub-data, where N is a natural number greater than or equal to two; and
 obtaining the plurality of write data blocks by encoding the N sub-data, the plurality of write data blocks comprising N data blocks and K parity blocks, where K is a natural number.

17. The method of claim 16, wherein X is less than or equal to K.

18. The method of claim 1, further comprising determining a natural number as X based on the operating temperature.

19. A storage device comprising:
 a nonvolatile memory; and
 a storage controller configured to:
  receive write data from a host device;
  monitor an operating temperature of the storage device;
  generate a plurality of write data blocks respectively corresponding to a plurality of storage regions of the nonvolatile memory based on the write data; and
  based on the operating temperature, perform a write operation on P write data blocks among the plurality of write data blocks by transmitting a write command to P storage regions among the plurality of storage regions and skipping the write operation on X write data blocks among the plurality of write data blocks by skipping an operation of transmitting the write command to X storage regions among the plurality of storage regions,
 wherein P and X are natural numbers.

20. A method of writing data in a storage device, the method comprising:
 receiving write data from a host device;
 monitoring an operating temperature of the storage device;
 dividing the write data into N sub-data, where N is a natural number greater than or equal to two;
 obtaining a plurality of write data blocks respectively corresponding to a plurality of storage regions of the storage device by encoding the N sub-data, the plurality of write data blocks comprising N data blocks and K parity blocks, where K is a natural number;
 based on the operating temperature being less than or equal to a first reference temperature, performing a write operation on each of the plurality of write data blocks by transmitting a write command to each of the plurality of storage regions;
 based on the operating temperature being higher than the first reference temperature, skipping the write operation on X write data blocks among the plurality of write data blocks and performing the write operation on only P write data blocks among the plurality of write data blocks, where X and P are natural numbers and X is less than or equal to K; and
 after skipping the write operation on the X write data blocks, based on a write completion request being received from the host device, the storage device being in an idle state, or the operating temperature becoming lower than a second reference temperature lower than the first reference temperature, additionally performing a subsequent write operation on the X write data blocks.

* * * * *